US011310996B2

(12) United States Patent
Griffioen et al.

(10) Patent No.: US 11,310,996 B2
(45) Date of Patent: Apr. 26, 2022

(54) LOCATING A MOBILE RADIOFREQUENCY TRANSMITTER USING A MOBILE RECEIVER

(71) Applicant: AGIS AUTOMATISERING B.V., Harmelen (NL)

(72) Inventors: Gerard Marie Griffioen, Harmelen (NL); Sander Leendert De Snoo, Harmelen (NL); Marcellinus Franciscus Maria Van Aalst, Harmelen (NL)

(73) Assignee: AGIS AUTOMATISERING B.V.

( * ) Notice: Subject to any disclaimer, the term of this patent is extended or adjusted under 35 U.S.C. 154(b) by 0 days.

(21) Appl. No.: 15/734,050

(22) PCT Filed: Jun. 3, 2019

(86) PCT No.: PCT/NL2019/050324
§ 371 (c)(1),
(2) Date: Dec. 1, 2020

(87) PCT Pub. No.: WO2019/231331
PCT Pub. Date: Dec. 5, 2019

(65) Prior Publication Data
US 2021/0127634 A1    May 6, 2021

(30) Foreign Application Priority Data

Jun. 1, 2018    (NL) ...................................... 2021045

(51) Int. Cl.
*G01S 5/02*    (2010.01)
*A01K 11/00*    (2006.01)
(Continued)

(52) U.S. Cl.
CPC .............. *A01K 11/008* (2013.01); *G01P 1/00* (2013.01); *G01P 15/18* (2013.01); *G01S 1/08* (2013.01);
(Continued)

(58) Field of Classification Search
CPC ....... A01K 11/008; G01P 15/18; G08B 21/18; G01S 1/08; G01S 11/02; G06F 3/04842; H04W 4/80
See application file for complete search history.

(56) References Cited

U.S. PATENT DOCUMENTS

| 7,502,619 | B1 * | 3/2009 | Katz | .......................... G01S 5/02 455/456.5 |
| 2009/0289737 | A1 * | 11/2009 | Itoh | ........................ H01P 5/222 333/120 |

(Continued)

FOREIGN PATENT DOCUMENTS

| WO | WO2002073562 A1 | 9/2002 |
| WO | WO2014007754 A2 | 1/2014 |

OTHER PUBLICATIONS

International Search Report and Written Opinion for corresponding International application No. PCT/NL2019/050324 dated Sep. 18, 2019 (18 pages).

(Continued)

*Primary Examiner* — Hongmin Fan
(74) *Attorney, Agent, or Firm* — Mendelsohn Dunleavy, P.C.

(57) ABSTRACT

An antenna module is described for configuring a mobile device, e.g., a smartphone, to locate an animal wearing a radiofrequency (RF) transmitter, the module having a directional antenna structure, the antenna structure including a plurality of antenna elements configured to generate a directional radiation field; at least one RF receiver connected to the directional antenna structure; and, a controller config- (Continued)

ured to control the RF transceiver and a mobile device interface for providing communication with the mobile device, the controller being configured to execute the steps of: receiving one or more time series of beacons signals broadcasted by the RF transmitter that is within the directional radiation field of the directional antenna structure; determining distance estimates for beacon signals in the one or more time series, a distance estimate being determined by the antenna module on the basis of a signal strength and/or a signal quality of a detected beacon signal.

20 Claims, 11 Drawing Sheets

(51) Int. Cl.
| | | |
|---|---|---|
| | *G01P 1/00* | (2006.01) |
| | *G01P 15/18* | (2013.01) |
| | *G01S 1/08* | (2006.01) |
| | *G01S 11/02* | (2010.01) |
| | *G08B 21/18* | (2006.01) |
| | *H04W 4/80* | (2018.01) |
| | *G06F 3/04842* | (2022.01) |

(52) U.S. Cl.
CPC ............. *G01S 11/02* (2013.01); *G08B 21/18* (2013.01); *G06F 3/04842* (2013.01); *H04W 4/80* (2018.02)

(56) References Cited

U.S. PATENT DOCUMENTS

| | | | |
|---|---|---|---|
| 2010/0297952 A1* | 11/2010 | Rofougaran | G06F 3/046 455/73 |
| 2011/0140967 A1* | 6/2011 | Lopez Pou | A01K 15/021 342/450 |
| 2011/0298619 A1 | 12/2011 | O'Hare et al. | |
| 2012/0112917 A1 | 5/2012 | Menachem et al. | |
| 2013/0005349 A1 | 1/2013 | Sanders et al. | |
| 2015/0205301 A1* | 7/2015 | Gilmore | G05D 1/12 701/11 |
| 2017/0064667 A1* | 3/2017 | Mycek | G01S 5/02 |
| 2017/0090010 A1 | 3/2017 | Dackefjord et al. | |
| 2018/0317073 A1* | 11/2018 | Taylor | G06Q 30/0631 |
| 2019/0036220 A1* | 1/2019 | Paulotto | H01Q 9/0407 |

OTHER PUBLICATIONS

Bakhar, Md. et al., "Microstrip Linear Phased Array for Smart Antenna Applications", International Journal of Electronics Engineering, 4.1 (2012): 39-42.

* cited by examiner

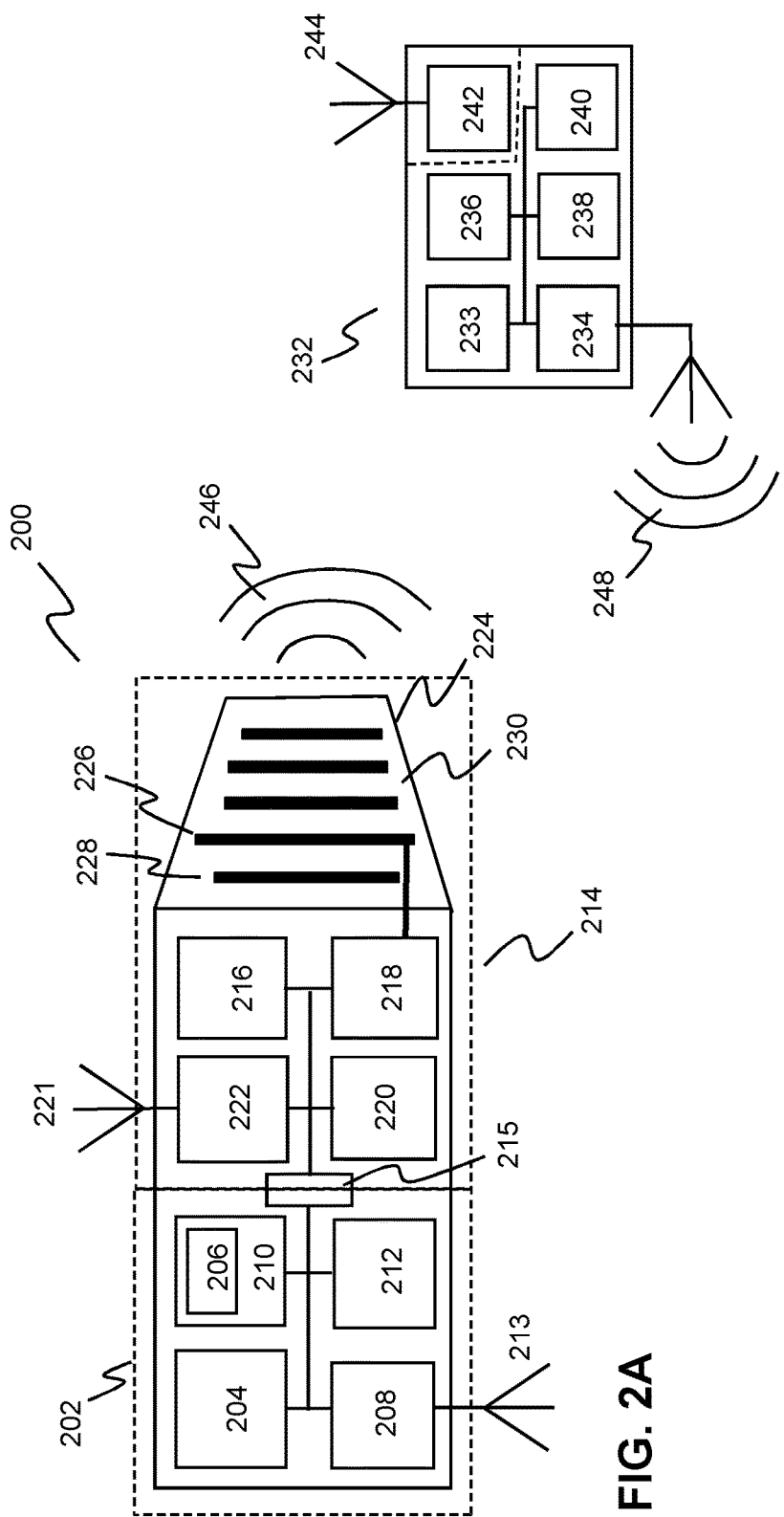

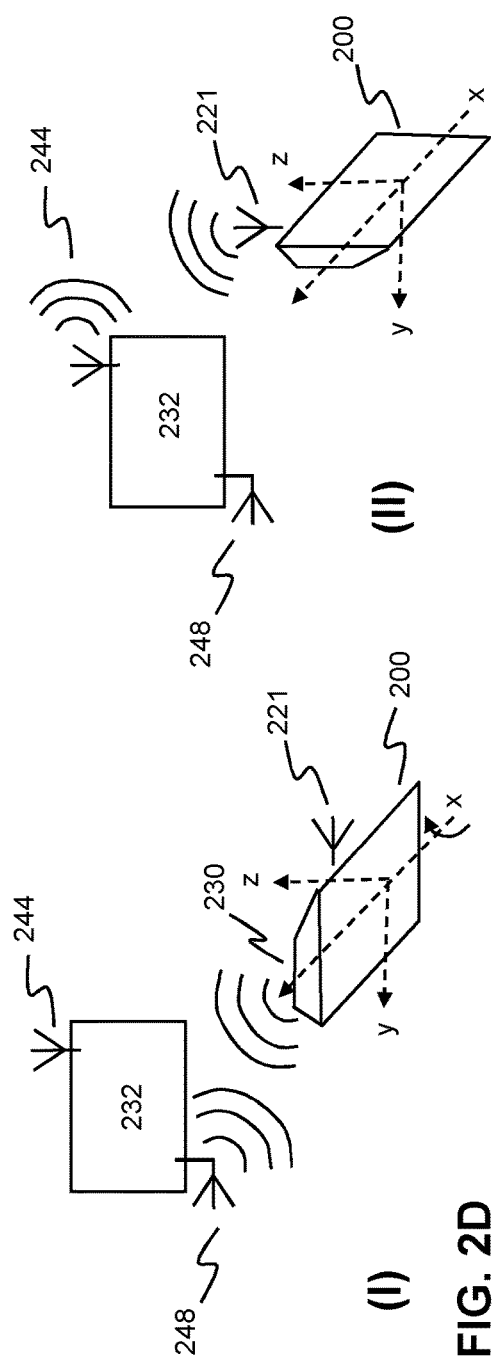
FIG. 2D
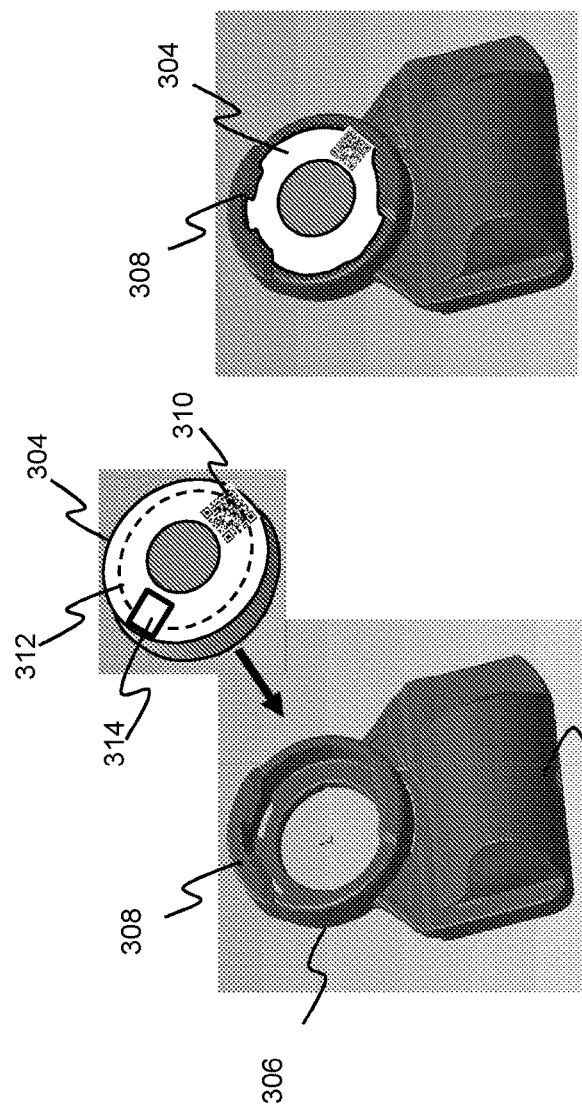
FIG. 3A
FIG. 3B

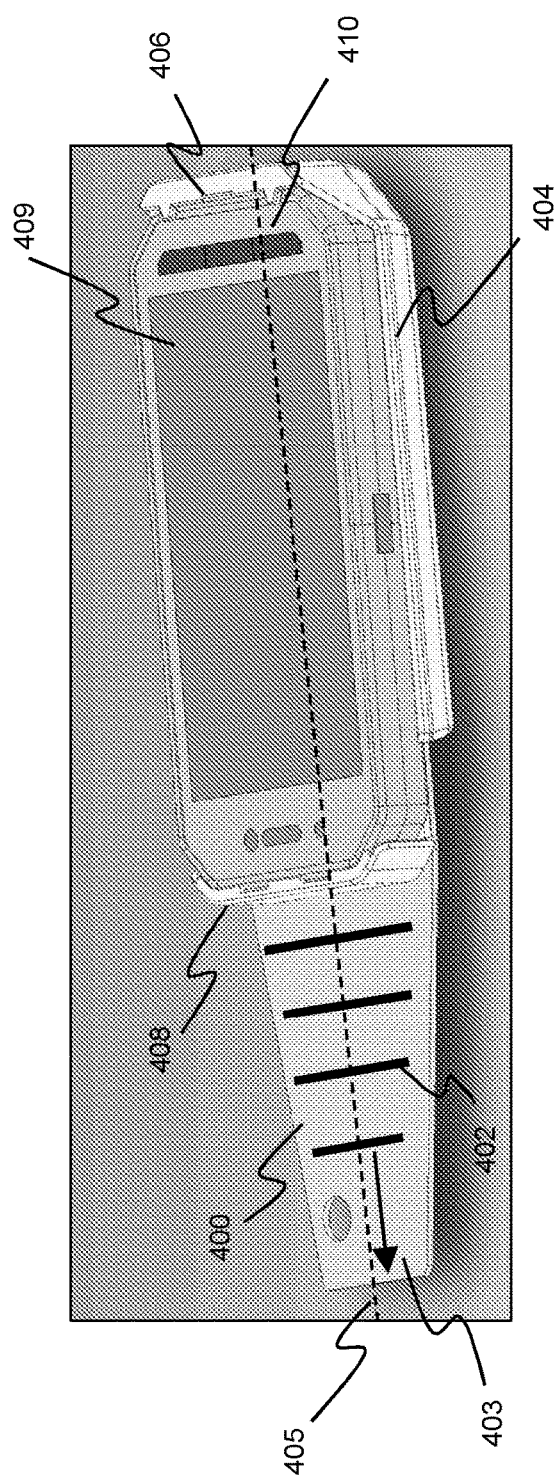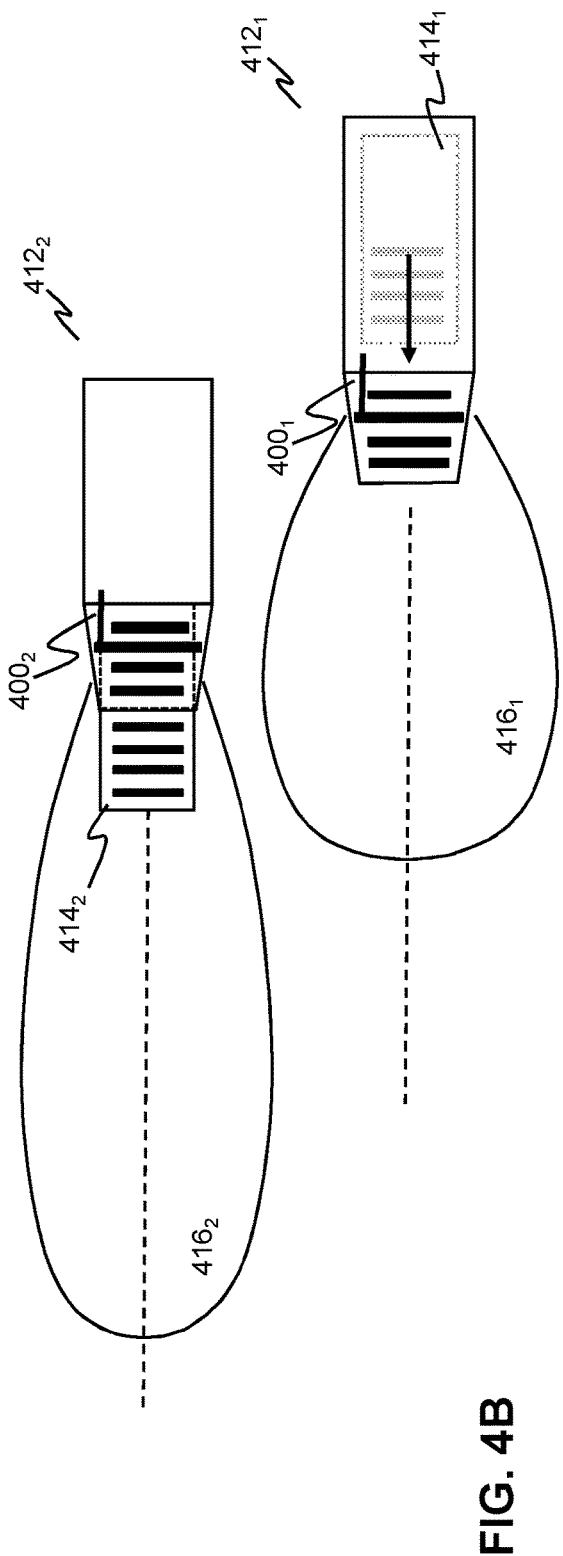
FIG. 4A
FIG. 4B

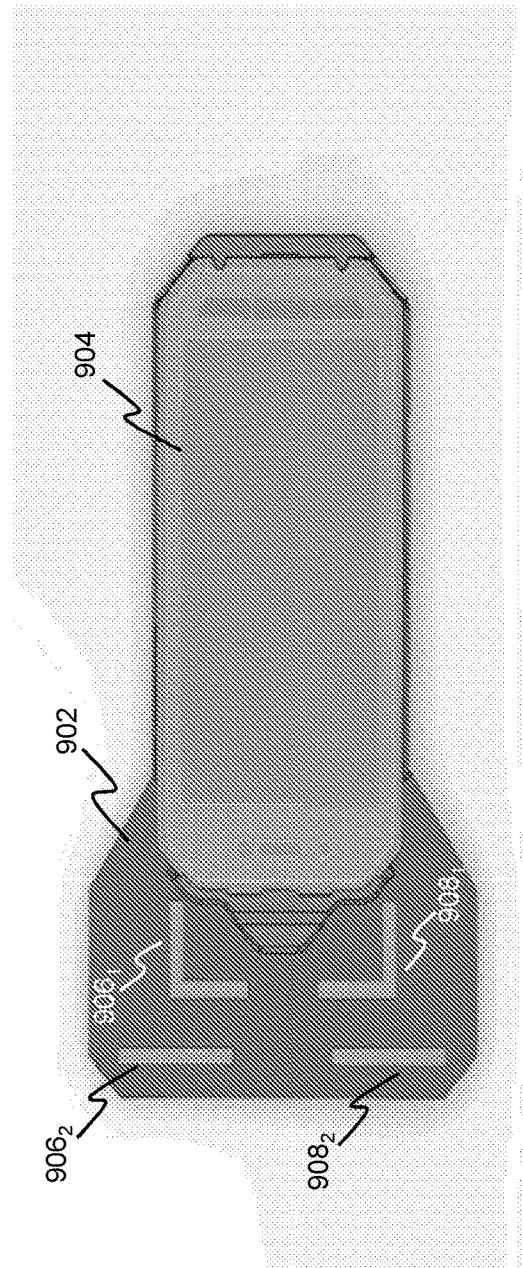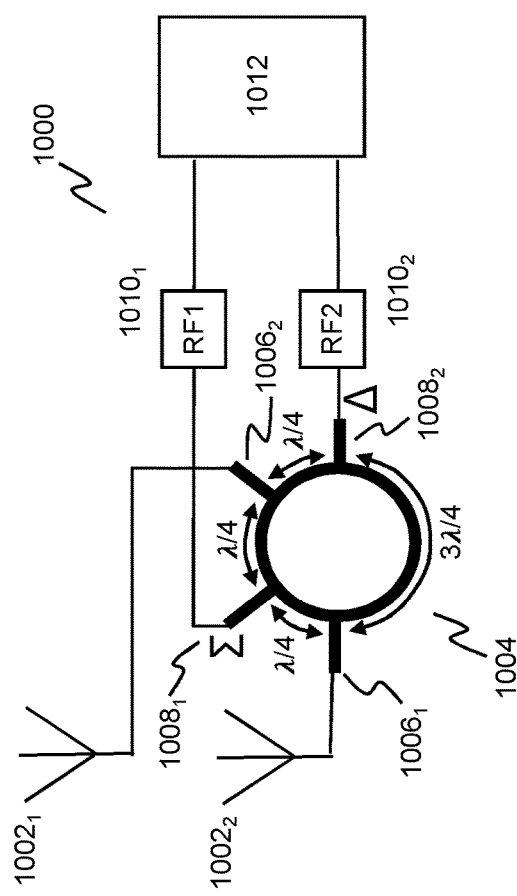
FIG. 9
FIG. 10

LOCATING A MOBILE RADIOFREQUENCY TRANSMITTER USING A MOBILE RECEIVER

FIELD OF THE INVENTION

The invention relates to locating a mobile radiofrequency transmitter, using a mobile receiver and, in particular, though not exclusively, to methods and systems for locating a mobile radiofrequency transmitter, a mobile device adapted to locate a mobile radiofrequency transmitter, an antenna module for configuring a mobile device to locate a mobile radiofrequency transmitter, and a computer program product for using such method.

BACKGROUND OF THE INVENTION

Nowadays radiofrequency (RF) systems are used to monitor or track the location of objects or animals, e.g. livestock in predetermined areas such as large cowsheds and/or (non-gated) grazing areas. An example of such livestock monitoring system is the CowManager™ system which comprises small wireless radiofrequency (RF) devices attached to a body part, e.g. an ear, of the animals and a system of stationary base stations located at various positions in the cowsheds and/or grazing areas.

The RF devices and base stations may form a wireless sensor network based on a wireless protocol such as Zigbee or the like. Typically, the network is operated in the industrial, scientific and medical (ISM) radio bands around 2.4 GHz. Each RF device may include a processor connected to a radio transceiver and one or more sensors, e.g. an accelerometer, a thermometer, etc., wherein data measured by a sensor in the RF device may be processed and transmitted to a base station that is within reception range.

The base stations are configured to communicate via a network to a central computer system that receives and processes data transmitted by the RF devices on the basis of an algorithm. The algorithm may be configured to accurately predict a physiological state (e.g. sleeping, ruminating, *Oestrus*, etc.) of the animal wearing the RF device on the basis of the measured sensor data. When monitoring the physiological state of the animals, a farmer may need to localize an animal, which is identified by the computer system to have a certain condition (e.g. it may identify that one or several animals are in *Oestrus*) amongst tens or hundreds of animals in the field.

An RF device worn by an animal in the field may be used to identify and localize the animal. The RF devices however should function under harsh conditions and for a long time, e.g. several years or longer, without the need for intermediate recharging and/or maintenance. Therefore, energy-consuming localization techniques such as GPS or the like cannot be used. Furthermore, RF devices will not have a continuous connection to the base station for continuously transmitting data to a base station. Instead, in order to reduce energy consumption, if an RF device is within the area that is covered by a base station, it will transmit collected data at regular time intervals to a base station. Typically, base stations are sparsely divided over the area and the animals are usually allowed to move freely over a relatively large area. Thus, localization on an animal on the basis of a triangulation technique using received signals by different base stations is not possible. In that case, only very course positioning is possible using e.g. the location of the base station a RF device most recently was connected to.

An example of a prior art localization system for livestock is described in US2012/0112917. This document describes a livestock monitoring system in which stationary base stations are used as a "coarse" location system for animals wearing a radio transceiver. The coarse location system provides information regarding the last time instance that the RF device of an animal contacted a particular base station. Thereafter, the system may activate the RF device as a transmitter. This way, the RF device broadcasts a signal that can be detected by a "fine" mobile localization device in the form of a mobile radio receiver. According to US2012/0112917, a user may use the receiver to locate the RF transmitter (an activated wireless device of a cow) amongst the other cows in the area that is covered by the base station.

The described livestock monitoring system however does not provide an efficient way of localizing RF transmitters worn by animals, especially when trying to localize a number of animals at the same time. A first problem relates to the fact that the livestock monitoring system only provides an area covered by the base station that was in contact with the RF device of the animal which an animal having a broadcasting RF device could be present, before a user can use its mobile localization device to pinpoint the exact position.

Secondly, detection of broadcasting RF devices in the GHz range using a single-point mobile receiver is not evident. The RF devices typically are equipped with a small antenna elements which have a non-homogenous, direction-sensitive radiation pattern. Further, the GHz radiation transmitted by a RF device can be (partly) absorbed by the body of the animal or neighbouring animals and/or it can be scattered by obstacles causing multi-path interference and signal scattering effects. Additionally, a RF device is connected to a moving body part, e.g. an ear, while at the same time also the animal can move and turn. These movements and all other effects described above will cause substantial fluctuations in the signal received by the mobile radio receiver.

Hence, from the above it follows that there is a need in the art for improved methods and systems for locating an animal wearing a RF device.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art. In an aspect the invention may relate to an antenna module for configuring a mobile device, e.g. a smartphone, to locate one or more radiofrequency (RF) transmitters, the module comprising: a directional antenna structure including a plurality of antenna elements, the antenna structure having a directional receiving pattern; a radio frequency (RF) receiver connected to the directional antenna structure; a mobile device interface adapted to communicate with the mobile device; a processor configured to control the RF receiver and a mobile device interface adapted to communicate with the mobile device, the processor being configured to execute the steps of: receiving one or more time series (e.g. one or more sequences) of beacon signals broadcast by one or more RF transmitters that are within the receiving pattern of the directional antenna structure, each beacon signal including at least a device identifier for identifying an RF transmitter that broadcasted the beacon signal; and, determining distance estimates for beacon signals in the one or more time series (the one or more sequences) associated with at least one device identifier, a distance estimate being determined by the antenna module on the basis of a signal strength and/or a signal quality of a detected beacon signal The beacon signals transmitted by an RF transmitter are attenuated by the objects in its path. For example, if the RF transmitter is attached to an animal, the signal may be attenuated by other (moving) animals that are in the neighborhood of the animal that wears the RF transmitted. Similarly, if the RF transmitter is attached to objects in a warehouse that are moved around, the signal may be attenuated by other objects in the neighborhood. Additionally, the RF transmitter typically uses an antenna comprising a radiation pattern that typically matches a dipole pattern so that the transmission strength of the RF transmitter depends on its orientation relative to the receiver. Therefore, the signal strength of the beacon signals will considerably fluctuate in time. In order to mitigate these problems the antenna module according to the invention includes a directional antenna which is controlled to generate distance estimates of (time series of) beacon signals transmitted by the RF transmitter.

The antenna module that can be connected to a mobile device, wherein the antenna module can be attached to a mobile device and wherein a client device can control the antenna module to generate distance estimates of time series of beacons signals transmitted by a mobile RF transmitter that is broadcasting at a certain distance. The distance estimates may subsequently be evaluated by the client application in order to generate a stable and reliable signal for visually indicating an estimated distance measure between a mobile receiver and a mobile RF transmitter. The RF transmitter may be worn by an animal, i.e. any type of animal, including mammals such as livestock, wildlife, and/or humans. A RF transmitter may be attached a body part, typically the ear, leg or wrist, of an animal or a human. For example, an RF transmitted may be attached to the ear of a livestock animal such as a cow, may transmit a radio beacon signal in the GHz range. Similarly, the RF transmitter may be attached to a (movable) object, e.g. a bike or the like.

In an embodiment, the antenna module may comprise: a planar support member for supporting the directional antenna structure; a housing connected to the support member for housing the RF receiver, the processor and the mobile device interface; and/or, one or more connectors for mechanically connecting the mobile device to the support member.

In an embodiment, the signal quality of a received beacon signal is based on the Link Quality Indicator as defined by the 802.15.4 Zigbee standard, preferably the distance estimate d being calculated on the basis of:

$$d = 2^{\frac{LQI-3(tx+A)-LQI\_1m}{LQI\_2x}}$$

wherein the parameter A represents a sensitivity of the directional antenna structure in dB, the parameter LQI_1 m represents a link quality for the RF transmitter broadcasting at a distance of 1 meter at a transmission level of 0 dB (in the strongest direction) and wherein LQI_2× is the change in LQI units when doubling the distance; and/or, wherein the signal strength is based on a signal strength of a received beacon signal, preferably a received signal strength indication (RSSI) of a beacons signal, preferably the distance estimate d being calculated on the basis:

$$d = 2^{\frac{RSSI-tx-RSSI\_1m}{6}}$$

wherein the parameter RSSI is the received signal strength indication (in units of dB), tx the transmission level in dB and RSSI_1 m the signal strength at 1 m when broadcasting at a transmission level of 0 dB (in the strongest direction).

In an embodiment, the plurality of antenna elements defines a yagi-type and/or patch-type and/or stripline-type antenna structure; or, wherein the plurality of antenna elements forms a linear phased array antenna structure including a plurality of antenna elements and a plurality of phase shifters configured to control the phase of a signal transmitted by each of the antenna elements; preferably the yagi-type antenna including: at least one reception electrode connected to RF receiver, a reflector electrode and one or more director electrodes.

In an embodiment, the RF receiver may be configured to detect beacon signals that have a transmission level selected between −20 and 10 dBm, preferably between −10 dBm and 0 dBm, more preferably around −8 dBm; and/or, wherein the broadcast interval of the beacon signals is selected between 1 and 10 Hz, preferably between 2 and 4 Hz; more preferably around 3 Hz and/or, wherein the beacon signals further includes at least one of: a sequence number, a time stamp, state information of an animal or object associated with the RF transmitter.

In an embodiment, the antenna structure may comprise a first directional antenna and a second directional antenna connected to a microstrip coupling structure, preferably a rate-race coupler or a hybrid ring coupler, the microstrip coupling structure including first and second input microstrip and first and second output microstrip connected to a circular microstrip, the input and output microstrip being connected to the circular microstrip such that when the first and second directional antenna receive a first and second signal respectively, the output signal at the first output of the microstrip coupling structure represents a sum signal of the first and second received signal and the output signal at the second output of the microstrip coupling structure represents a difference signal between the first and second received signal.

In an embodiment, the circular microstrip may include a top half part and a bottom half part, the top half part and the bottom half part each having a length of three quarter wavelength, the first input, the first output, the second input and the second output being located along the top part of the circular microstructure, the distance between the input/output or output/input being a quarter wavelength, the wavelength being the wavelength at which the first and second directional antenna detect the beacon signals.

In an embodiment, the antenna module may comprise an antenna extender for extending the directionality and the receive sensitivity of the antenna, preferably the antenna extender being connected, preferably slideable connected, to the (back of the) planar support member of the directional antenna; more preferably in an extended state the antenna extender extending the antenna structure of the antenna module with one or more director electrodes.

In an embodiment, the mobile device interface for establishing communication between the controller and the mobile device, may comprise a hardwired interface, the hardwired interface including an electrical connecter, preferably an USB and Firewire connector; and/or wherein the mobile device interface comprises a wireless interface, preferably a Bluetooth interface or an NFC interface; and/or, wherein the antenna module and the RF transmitter are configured to communicate on the basis of a wireless communication standard, preferably the wireless communication standard including at least one of: Zigbee (IEEE 802.15.4), Z-Wave, WiFi (IEEE 802.11), Sigfox, Neul, LoRaWan.

In an aspect, the invention may relate to a mobile device for locating one or more radiofrequency (RF) transmitters comprising: an antenna module comprising a directional antenna structure including a plurality of antenna elements, the directional antenna structure having a directional receiving pattern; a radio frequency (RF) receiver connected to the directional antenna structure; and, a controller configured to control the RF receiver; a processor connected to a computer-readable memory, the processor including an interface for communication with the controller of the antenna module; a client application stored in the computer-readable memory of the mobile device, wherein when the client application is executed by the processor, the client application being configured to execute the steps of: instructing the controller of the antenna module to receive one or more time series of beacon signals broadcasted by at least one of the one or more RF transmitters that is within the directional receiving pattern of the directional antenna structure, a beacon signal including a device identifier for identifying the at least one RF transmitter and to determine distance estimates for beacon signals in the one or more time series, a distance estimate being determined on the basis of a signal strength and/or a signal quality of a detected beacon signal; using the distance estimates to generate an estimated distance between the mobile device and the RF transmitter; and, generating a graphical user interface (GUI) on a display of the mobile device, the GUI including the device identifier and one or more graphical indicators for indicating the estimated distance.

In an embodiment, using the distance estimates to generate an estimated distance may further include: evaluating the distance measures of the beacon signals in a time series on the basis of a plurality of time windows of different time durations, each time window being associated with a distance range and a distance threshold; and, using the distance thresholds of the time windows to determine the time window in which the smallest distance estimate associated with a beacon signal is located.

In an embodiment, the antenna structure may comprise a first directional antenna and a second directional antenna, the first and second directional antenna connected to a microstrip coupling structure, the coupling structure being configured to generate a difference signal between the first and second received signal; wherein the client application is further configured to execute the steps of: using the difference signal to determine a signal indicative of a direction from which the broadcasting RF transmitter is transmitting; generating on the basis of the signal a graphical user interface (GUI) comprising one or more graphical indicators indicating a direction of the broadcasting RF transmitter.

In an embodiment, the mobile device may be a smartphone or an electronic tablet and wherein the antenna module comprises one or more connectors for mechanically connecting the mobile device to the support member; and, a mobile device interface adapted to communicate with the mobile device, preferably the mobile device interface comprising a hardwired interface, the hardwired interface including an electrical connecter, preferably an USB and Firewire connector, for establishing communication between the antenna module and the mobile device; and/or wherein the mobile device interface comprises a wireless interface, preferably a Bluetooth interface or an NFC interface for establishing communication between the antenna module and the mobile device.

In an embodiment, the RF transmitter may be included in a wireless sensor device attached to a body part of an animal or attached to a movable object, the sensor device further comprising a RF transmitter and one or more sensors, e.g. an accelerometer and/or a temperature sensor, the sensor device being configured to measure and collect sensor data of the animal or object to which it is attached to and transmit the measured data to a server, the server being configured to determine a status, e.g. physiological status, of the animal or object on the basis of the measured data; wherein the mobile device further comprises a radio interface for establishing a data connection, preferably an Internet connection, with the server.

In an embodiment, the client application may be further configured to execute the steps of: requesting the server status information of the sensor device; receiving status information from the sever; generating a GUI comprising a graphical indicator, the GUI enabling a user to select the sensor device by interacting with the displayed graphical indicators; and, upon selection of the sensor device by a user, the client application sending a message to the server, the message instruction the server to activate the sensor device to transmit beacons signals for a predetermined time period.

In an embodiment, the mobile device further may include an RFID reader and an orientation sensor, wherein if the orientation sensor determines that the mobile device is in a first orientation the processor of the mobile device activating the antenna module for locating at least one of the one or more RF transmitter and if the orientation sensor determines that the mobile device is in a second orientation the processor of the mobile device activating the RFID reader for reading an RFID tag associated with at least one of the one or more RF transmitters.

The mobile device comprising a RF receiver and a RFID reader allows very efficient registration of the sensor devices with the monitoring system. For example, new sensor devices may be registered with their sensor ID in the database of the server. A user may subsequently, use the mobile localization device in the RF scanning mode to activate a new sensor device so that it starts transmitting beacon signal that can be detected by the directional receive antenna of the mobile localization device. Upon reception of the beacon signals, the mobile localization device may receive beacons signals comprising the sensor ID (SID) of the sensor. Then, the user may switch the mobile location device in the RFID mode and read-out the animal ID (the CID). The user may then use the mobile location device to send the sensor ID and the read animal ID to the server and instruct the server to register the CID with the CID. This way, the sensor ID and the animal ID are correctly registered in the database of the monitoring system.

Hence, in an embodiment, the registration process may include to the steps of: using the mobile location device to request the server of the monitoring system to activate a sensor device that needs to be registered in the database of the monitoring system; the mobile device receiving beacon signals of the activated sensor device, the beacons signal including a first ID identifying the sensor device; using an RFID reader of the mobile location device to read-out an RFID tag associated with the sensor device, the RFID tag including a second ID identifying an animal or an object to which the sensor is attached to or is going to be attached to; sending the first ID and second ID to the server of the monitoring system and requesting the monitoring system to register the second ID with the first ID in the database of the monitoring system.

In an aspect, the invention relates to a method of locating a radiofrequency (RF) transmitter using a mobile device comprising a directional antenna, the method comprising: receiving one or more time series of beacon signals broadcasted by the RF transmitter that is within the directional receive pattern of the directional antenna structure; receiving distance estimates for beacon signals in the one or more time series, a distance estimate being determined on the basis of a signal strength and/or a signal quality of a detected beacon signal; generating an estimated distance between the mobile device and the animal wearing the RF transmitter on the basis of the distance estimates; and, generating a graphical user interface (GUI) on a display of the mobile device, the GUI including one or more graphical indicators for indicating the estimated distance; wherein the generating an estimated distance includes: evaluating the distance measures of the beacon signals in a time series on the basis of a plurality of time windows of different time durations, each time window being associated with a distance range and a distance threshold; and, using the distance thresholds of the time windows to determine the time window in which the smallest distance estimate associated with a beacon signal is located.

In a further aspect, the invention relates to a system for monitoring a plurality of sensor devices comprising: a plurality of wireless sensor devices, preferably each of the plurality of wireless sensor devices being attached to a body part of each of a plurality of animals respectively or attached to each of a plurality of objects, each sensor device comprising a radiofrequency (RF) transceiver and one or more sensors, e.g. an accelerometer and/or a temperature sensor, the sensor device being configured to measure and collect sensor data of the animal or object to which it is attached; one or more base stations connected to a server, each of the base stations being located at a predetermined location and configured to: establish a wireless connection with the RF transceiver of a wireless sensor device, if the sensor device is within the reception area of the RF antenna of the base station; and, transmit the sensor data via the wireless connection to the base station; a mobile device as described with reference to the embodiments of this disclosure, wherein the mobile device comprises a radio interface for establishing a data connection, preferably an Internet connection, with the server, wherein the client application is further configured to execute the steps of: receiving from the server information of one or more sensor devices of the plurality of sensor devices that are monitored; generating a GUI comprising a graphical indicator for each of the one or more sensor devices, the GUI enabling a user of the mobile device to select one of the one or more sensor device by interacting with the displayed graphical indicators; and, upon selection of a sensor device by a user, the client application sending a message to the server, the message instruction the server to activate the sensor device to transmit beacons signals for a predetermined time period.

In an embodiment, the at least one of the one or more base stations comprises a 2D phased array antenna positioned at a predetermined location and at a predetermined height, a base station controller of the at least one base station being configured to: establish communication with a sensor device on the basis of a beam-shaped radiation field generated by the 2D phased array antenna; estimate the distance between the base station and the sensor device; and, to determine a location of the sensor device on the basis of the distance, the height of the antenna and the direction of the beam shaped radiation field.

In yet another aspect, the invention relates to a wireless sensor device attachable to a body part of an animal comprising: one or more sensors for generating sensor data associated with physiological parameters, e.g. movement or temperature, of the animal; a transceiver configured to communicate with a server, the server including a classification processor configured for determining a physiological state of an animal based on sensor data transmitted by the transceiver to the server; a computer readable storage medium having computer readable program code embodied therewith, and a processor, preferably a microprocessor, coupled to the computer readable storage medium, wherein responsive to executing the first computer readable program code, the processor is configured to perform executable operations comprising: receiving a message from the server, the message including an instruction for the processor to activate the wireless sensor device to broadcast beacon signals for a predetermined time and to insert state information, preferably a binary value, in each beacon signal, the state information being indicative of the physiological state of the animal as determined by the server; and, in response to the message, the transceiver broadcasting beacon signals, wherein each beacon comprises an identifier identifying the sensor device and the state information.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 2A-2D schematically depict a sensor device and a mobile location device according to an embodiment of the invention;

FIGS. 3A and 3B depict an exemplary implementation of a sensor device according to an embodiment of the invention;

FIGS. 4A and 4B depict exemplary implementations of a mobile location device according to an embodiment of the invention.

FIG. 9 depicts a schematic of mobile location device comprising a plurality of directional antenna devices according to an embodiment of the invention.

FIG. 10 depicts an implementation of (part of) an antenna module according to an embodiment of the invention.

DETAILED DESCRIPTION

Figure 1:
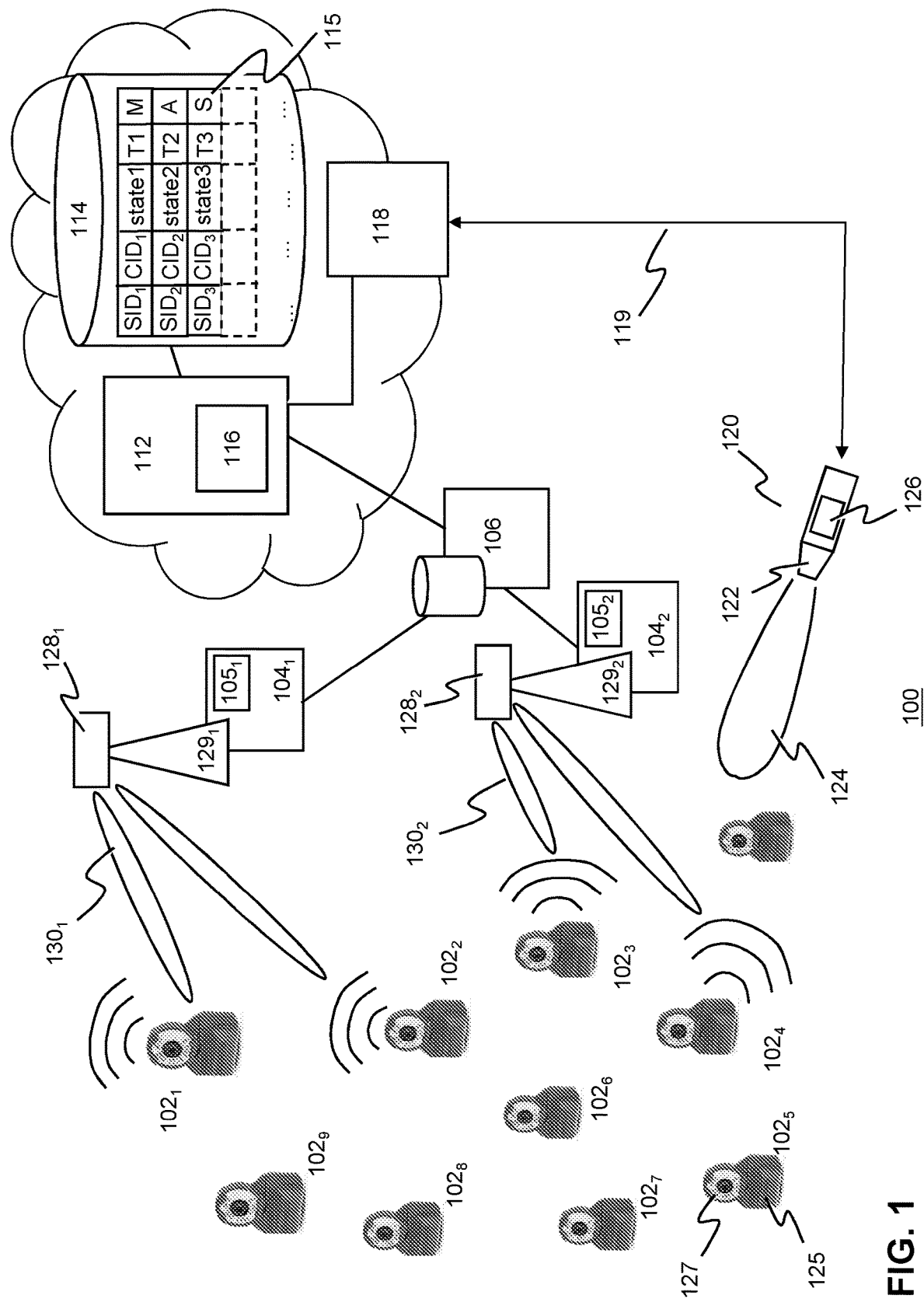
FIG. 1 schematically depicts a monitoring system according to an embodiment of the invention.

FIG. 1 schematically depicts a monitoring system according to an embodiment of the invention. As shown in FIG. 1 the monitoring system may comprise a plurality of wireless mobile radiofrequency (RF) devices $102_{1-9}$ and one or more (static) base stations $104_{1,2}$ connected via one or more routers 106 to a server system 112. Each wireless RF device may comprise a RF transceiver for wireless communication with a base station if it is within communication range of the base station. In an embodiment, a wireless RF device may be attached to an animal (not shown), e.g. livestock such as a cow. In another embodiment, each of the wireless RF devices may be attached to an object. The electronics of the wireless sensor device may be contained in a housing 125 which comprises a structure 127, e.g. a clamp, for attaching the tag to a body part (e.g. an ear) of an animal or to an object that needs to be monitored and localized.

In an embodiment, the monitoring system 100 of FIG. 1 may be configured to monitor animal behaviour. In that case, a wireless RF device may comprise one or more sensors, e.g. an accelerometer, temperature sensor, etc., for measuring physical/vital sign parameters of an animal. For example, a 3D accelerometer in a sensor device may be configured to measure movements (accelerations) in three directions of an animal as a function of time. Such wireless RF device may be referred to in short as a wireless sensor device. The wireless sensor devices may for example detect movements (accelerations) of the animals, including ear movements or movements of other body parts of the animal. A microprocessor in each of the wireless sensor devices may control the sensors in order to continuously or periodically collect (buffer) sensor data such as acceleration data generated by an accelerometer and determine one or more parameter values on the basis of the collected data. If an animal is within the range of a base station, the parameters may be transmitted by the radio transceiver to a base station, which may further relay the data via routers to the server system. The parameters may be transmitted by the wireless sensor devices to the computer in a suitable data container, a data packet, wherein a data packet may comprise a unique identifier (ID) so that the computer is able to link data contained in the data packet to a wireless sensor device of a particular animal.

In another embodiment, the monitoring system may be configured to monitor the structural, physical and/or chemical status of a plurality of objects, wherein each object is attached to a wireless sensor device. For example, a wireless sensor device may receive one or more sensor outputs (e.g. temperature, vibration, detection of a chemical compound, etc.) and transmit this information via a base station to a server of the monitoring system.

The base stations are located in the area where wireless sensor devices are monitored. For example, when monitoring animals, the base stations may be located in a barn and/or a (gated or non-gated) area of considerably size. The base stations are therefore sparsely divided over a large area so that typically full coverage of the area by the basis stations is not realized. Therefore, an RF sensor device is not always in contact with a base station. The wireless communication may be based on a suitable wireless protocol, e.g. ZigBee, WiFi, WiMax, Bluetooth or another suitable technology for managing a wireless (ad-hoc) sensor network on the basis of small, low-power radio transceivers. The base stations may relay the data to a router 106 which forwards the measured sensor data to the server system 112. A storage medium 114 connected to the server may be used for centrally storing sensor data in the network. In an embodiment, (part of) the server system may be configured as a cloud system for providing a scalable data processing platform for the monitoring system.

The server system may comprise a processor 116 for executing a server application that is capable of processing the sensor data. The server application may be stored on a computer-readably memory and may include computer code which, when executed by the processor, is configured to classify the measured parameter values. For example, the server application may classify sensor signals of monitored animals into one or more animal behavior categories and/or one or more physiological states. The classification processor may perform statistical data analysis on a set of collected parameter values in order to derive predictive information on the type of behavior and/or the type of physiological state of the animals. As shown in FIG. 1, the storage medium may comprise a database format wherein data (sensor data and data derived from the sensor data) can be linked to the monitored animals using the IDs of a sensor devices (SID1, SID2, SID2, ... ). The SID may be for example (part of) the MAC address of the sensor device. The database may further identifiers of animals or objects (CID1, CID2, CID3, ... ) to which the sensor device is attached to. In some embodiments, the CID of an animal (e.g. a cow) is stored in an RFID tag that is attached to the animal or the object. In an embodiment, the RFID tag is part of an attachment structure for attaching the sensor device to an animal, e.g. the ear of an animal. The sensor data of an animal may be used to predict a particular behavior and/or physiological state of an animal (state1, state2, state3, ... ). Further, one or more measured parameters may be stored, e.g. the temperature (T1, T2, T3, ... ) of an animal of an object (in case the sensor includes a temperature sensor). Other information may include status information 115 (metadata) associated with the sensor device, e.g. location of a sensor device when it communicates with a base station and the status of a wireless sensor device, e.g. battery power or the like. In an embodiment, the status information of a wireless sensor device includes information indicating that the sensor device is in a certain state, e.g. a monitoring state "M", in which it collects sensor data and transmits the data to a base station); or, an activated state "A", in which the RF transmitter of the sensor device broadcasts beacon signals for a predetermined period of time. As will be described hereunder in more detail, the beacon signals may be used to locate the sensor device using a mobile location device. The process of measuring sensor data, determining one or more parameter values on the basis of the measured sensor data, classifying the one or more determined parameter values into different activity physiological classes of an animal (e.g. active, sleeping, ruminating, *Oestrus*, etc.) and/or determining location and/or status information of a sensor device may be repeated in time so that the current data and historical data of the sensor device is available to a user of the system.

Beside monitoring sensor signals (e.g. vital signs and/or the physiological state of the animals or sensor signals associated with an object), the monitoring system may also be adapted to determine and track positions of wireless sensor devices. The monitoring system should be able to operate in remote areas and the wireless sensor devices should be able to work for a considerably time, e.g. two years or longer, without the need to recharge the batteries. Hence, a wireless sensor device cannot be equipped with energy-consuming localization techniques such a GPS module. Moreover, localization of an animal based on a triangulation technique (using received signals by different base stations) is not possible because the sparse distribution of base stations over a large area and because livestock is usually allowed to freely move over the area. Therefore, prior art systems are only capable of providing a course estimation of the position of an animal, typically somewhere in the area covered by the last base station to which an RF sensor device has been connected to.

In order to address this problem, base stations $129_{1,2}$ may include an antenna that comprises a 2D phased array module $128_{1,2}$. The antenna may be installed at a predetermined height above the ground and at a predetermined (absolute) geo-position (based e.g. on measured GPS coordinates).

A base station controller $105_{1,2}$ in the base station may be configured to control the phased array module in order to form a beam-shaped radiation field $130_{1,2}$. The controller may control the phased array antennas in order to control the length and direction of the beam-shaped radiation field. This way, the controller is able to scan the area around the base station and use e.g. the RSSI signal to locate one or more wireless sensor devices. If during scanning of the beam-shaped radiation field a wireless sensor device is detected, the controller may use the RSSI signal to accurately point the beam-shaped radiation field in the direction of the transmitting RF device. The wireless sensor device may then connect to the base station and transmit measured sensor data to the base station. Additionally, the base station controller may execute a distance measurement in order to determine (an estimate of) the distance between the antenna and the wireless sensor device. In an embodiment, the controller may use a signal representing a signal strength or signal quality (e.g. the RSSI or the LQI signal) to estimate the distance between the antenna module and the transmitting wireless sensor device. Alternatively, it may use a time-of-flight (TOF) measurement to determine the distance.

Then, based on the measured distance, the height at which the antenna is installed and the position of the antenna, an exact location of the broadcasting RF device can be determined. This way, when wireless sensor devices are within the range of the antenna of the base station, a connection may be established between the base station and the RF device so that sensor data can be transmitted to the base station and an absolute location of the RF device can be determined. Hence, in addition to monitoring the physiological state of the animals on the basis of the sensor data, the system is also able to monitor the (absolute) location of the wireless sensor device within the areas that are covered by the base station.

A user of the monitoring system can connect to the monitoring system using a client device, e.g. a software application, that runs on a mobile device of the user. Hence, the monitoring system, in particular the server application executed by server processor 116, is configured to communicate with a client device, e.g. a client software application 126, which may be stored on a computer-readably memory of a mobile device 120, typically a smartphone of a user of the monitoring system. The client device may set up a communication channel 119, e.g. an Internet connection, with server system. A suitable protocol, e.g. a client-server protocol such as the HTTP protocol or the like, may be used for communication between the server and the client device. The client device enables users of the monitoring system to access the database stored in storage medium 114 of the server, select and retrieve information from the database and display the information on a graphical user interface (GUI) of the mobile device. The client device may be implemented as an application (an app) that may be downloaded and installed on the smartphone of a user of the monitoring system. This way, a user, e.g. a farmer, is able to monitor large amounts (e.g. thousands) of animals simultaneously and the system may warn a user if e.g. an animal is sick or shows *Oestrus* behavior.

The location information determined by the base stations using e.g. the controllable phased array antennas, provide a user an initial estimate of the location of a wireless sensor device. Nevertheless, if a user would like to physically examine an animal at location, precise localization and on-site identification of an animal may pose a problem. An animal or an object may have moved since the last position measured by the monitoring system. Moreover, an animal that needs to be located may be positioned between many other animals so that identification is difficult. The same problems occur when using the monitoring system for monitoring movable objects in a large area, e.g. boats or the like.

In the prior art it is suggested to use a mobile location device with a directional antenna for locating a transmitting RF devices. However, locating a wireless sensor device worn by an animal or an object that moves or is positioned between many other (moving) animals or objects is not evident as the signal of the RF device will be absorbed by the body of an animal or object. Additionally, reflections will may cause multi-path interference effects and collisions may occur with other transmitting RF devices. Moreover, the antenna of a wireless sensor device is typically configured as a dipole antenna which has a directionality in its radiation field. Therefore, if the wireless sensor device is e.g. attached to an ear of an animal, the movement of the animal's ear will cause the wireless sensor device to move thereby causing changes in the transmission direction of the wireless sensor device in time. Therefore, the signal that a receiver needs to detect will fluctuate considerably.

In order to solve these problems, the mobile device is provided with an antenna module 122 that is capable of configuring the mobile device of the user as a location device, which is capable of accurately locating a transmitting sensor device within a predetermined distance from the user. In an embodiment, the antenna module may be removably fixated to the mobile device of the user. In another embodiment, the antenna module may be part of the mobile device.

The antenna module may include a compact directional antenna structure, preferably a planar stripline directional antenna structure, connected to a receiver wherein the directional antenna structure has a directional radiation pattern and associated receive pattern. Due to the reciprocity property of an electrical antenna, the electrical characteristics (gain, impedance, resonant frequency, etc.) of an antenna are identical whether the antenna is transmitting or receiver. Hence, the radiation pattern of a transmitting directional antenna is identical to the receiving pattern (i.e. the sensitivity as a function of direction) of the antenna when it is receiving. In an embodiment, the antenna module may have a directional far field receive pattern 124 so that has a high sensitivity in the forward direction. The sensitivity of the antenna in forward direction in combination with the sensitivity of the RF receiver and the strength of the signal transmitted by the device on the animal is strong enough to receive signals from a distance of 250 to 500 meters, which enables a user to detect a transmitting sensor device at a substantial distance. The receiver may be connected to a processor which may be controlled by client software that is executed on the mobile device.

For example, in an embodiment, the monitoring system may determine on the basis of the sensor data received from the sensor devices, that one or more animals may have a certain physiological condition, e.g. a sick cow or a cow showing *Oestrus* behavior. In that case, a user may want to physically examine or treat the one or more animals as soon as possible and to locate them using a mobile device that is configured as a mobile location device. To that end, the user may use a client device (i.e. a software application executed on the mobile device) to instruct the monitoring system, in particular the server of the monitoring system, to activate the wireless sensor device of the one or more identified animals (e.g. sensor devices $102_{1-4}$ in FIG. 1), i.e. to set the wireless sensor device in an activate state. For example, the monitoring system may send a message to a sensor device of an identified animal, wherein the message includes an instruction for the processor of the sensor device to set the sensor device in the activated state for a predetermined time. During the activated state the sensor device will broadcast a predetermined beacon signal at a predetermined frequency and for a predetermined period which can be detected by the mobile location device.

A user may visit the location in the area of the base station in which the wireless sensor device of the animal was localized using the location information stored in the database of the monitoring system. At the location, a user may scan the area by pointing the antenna module of the mobile device in different directions. If an activated sensor device is positioned within the directional receive pattern of the antenna module, the antenna module may detect the beacons signals broadcasted by the activated sensor device. The client application on the mobile device may determine a distance estimate on the basis of beacons signals. In the pointing direction where the signal strength of the beacon signals is at a maximum, the mobile location device may determine an estimate of the distance between the mobile location device and the broadcasting RF device and use this information to generate a graphical user interface to display the distance estimate to the user. In some embodiments, the antenna module may also be configured to determine a signal and a graphical user interface which provides an indication of a direction in which the broadcasting RF is location.

Hence, the antenna module may receive beacon signals and provide information about the beacon signals, e.g. a signals strengths of beacon signals, to the client device. The client device subsequently processes the information received from the antenna module in order to determine an estimate of the distance and generate a first graphical user interface which is configured to display the estimated distance to the user. Additionally, in some embodiments, the antenna module may be configured to receive the beacon signals and generate a signal that is indicative of a direction in which the activated wireless sensor device is located. In that case, the client device is configured to process the signal and generate a second graphical user interface which is configured to display a direction to the user. Then, when the user has detected a direction in which an activated sensor device should be located, a user may walk into that direction and use the mobile device to check that the distance between the animal and the mobile device becomes smaller.

While the monitoring system of FIG. 1 is described with reference to wireless sensor device (i.e. mobile RF devices that include or are associated with one or more sensors for measuring sensor data and transmitting the data to a base station) other type of wireless devices can also be used, e.g. a mobile wireless RF device without sensors that can be activated via the base station to broadcast beacons signals for a predetermined amount of time so that the activated wireless device can be located using a mobile location device as described in this application.

FIG. 2A-2D schematically depict a sensor device 232 (FIG. 2B) and a mobile location device 200 (FIG. 2A) according to various embodiments of the invention. The mobile location device 200 may include a mobile device 202 connected to an antenna module 214. The sensor device may include an attaching structure to attach the sensor device to a body part of an animal and measure (sense) information associated with the animal, including but not limited to motion, pose and/or temperature. As shown in FIG. 2B, the sensor device may include a battery (not shown), a (real time) clock 240, a motion and/or orientation sensor, e.g. accelerometer 238, a radio module 234 and a processor 233 connected to a memory 236. In some embodiments, the sensor device may include further sensors, e.g. a temperature sensor or a vital sign sensor such as an SpO2 sensor or the like.

The accelerometer may be implemented as a chip comprising e.g. a MEMS-based (e.g., micro-mechanical system technology), tri-axial acceleration sensing electronics that are configured to generate general acceleration data, e.g. data on the directional components of acceleration (e.g., acceleration components of an acceleration vector along the orthogonal x, y, and z axes).

The accelerometer chip in the sensor device may be configured to generate a time-series of instantaneous accelerations of the sensor along the x, y, z axes. For example, the accelerometer chip may generate a sequence of acceleration data formed by successive measurements of the acceleration signal over a time interval. For example, in an embodiment 60 acceleration data may be generated in a one minute leading using a 1 Hz sampling frequency. The accelerometer may comprise an analog-to-digital (A/D) converter configured to sample the analog acceleration signals transduced by the on-board MEMS acceleration sensor and to generate corresponding (digital) acceleration data values comprising directional components of an acceleration vector (e.g., $a_x(t_n)$, $a_y(t_n)$ and $a_z(t_n)$, where integer n represents time instance $t_n$). During the sampling of the accelerations, the acceleration data may be (temporarily) stored in a memory (e.g. a cache) of the sensor device. As is discussed below, the acceleration data may be measured at a very low sampling rate compared to the frequencies of motion expected from the cow. Hence, the acceleration data do not contain enough information to reconstruct all the underlying physical accelerations (e.g., accelerations of the animal occurring between the acceleration samples).

Further, the sampling period may be set to characteristic time scales of (collective) animal behavior. The behavior of an animal is not constantly changing. For example, the global behavior of a herd of cows is mostly constant for a predetermined time, e.g. 15-30 minutes. Based on these observations, parameter values that correlate with the actual behavior of a cow or a herd of cows may be determined every minute or every few minutes. This way sufficient data is generated by the sensor in order to monitor changes in the behavior of the animals with sufficient accuracy.

The accelerometer may send the acceleration data over a data bus to the processor 233. The microprocessor may use the acceleration data, sampled by the accelerometer within a predetermined time window (e.g. one-minute time period), to determine one or more parameters that may be used in a statistical analysis method that allows classification of animal behavior and/or the activity level of an animal. In an embodiment, the microprocessor may use the acceleration data associated with a sampling period in order to determine an activity parameter that is indicative of the activity level of an animal. Then, the processor may timestamp the parameter and store it in the memory for transmission. This process may be repeated periodically so that a number timestamped parameters are buffered in the memory.

The processor may format the buffered parameters as payload in one or more data messages which may be sent by the radio module 234 to a base station as soon as the animal wearing the sensor device is in the area that is covered by the antenna of the base station. Such message may include a sensor identifier ID, e.g. (part of) the unique MAC address of the sensor device, which may be used for identifying the sensor. Further, a message may comprise time information, e.g. one or more timestamps of a (real-time) clock in the sensor device, for linking a time instance to each of the determined parameters. In an embodiment, after receipt of the data message, the base station may transmit an acknowledgement message back to the sensor device so that it knows that the data message has been successfully transmitted.

In some embodiments, the sensor device may include or be associated with an RFID tag 242, preferably a passive RFID tag, comprising a coil connected to an integrated chip that includes electronics for controlling the tag. The tag can be read out via magnetic coupling between the coil of the RFID tag and a coil of the RFID reader 222,221 in the antenna module. The RFID tag may include an electronic chip in which information of the animal is stored. This information may include, e.g. a unique identification number, place and time of birth, gender, owner, etc. The information may include registration information of the animal as required by (inter)national legislation.

An exemplary implementation of a sensor device is described below with reference to FIGS. 3A and 3B.

The mobile device 202 connected to the antenna module may be a mobile communication device, e.g. a smartphone or a radio connected electronic table. Such mobile device may include a (micro)processor 204 connected via a data bus to a computer-readable memory 210. One or more client applications 206 may be stored in the computer-readable memory, which may be executed by the processor. The processor may be further connected to a radio module including a radio frequency (RF) transceiver 208 connected to one or more RF antennas 213.

The radio module ensures that the mobile device can connect to the Internet via a suitable telecommunications standard, e.g. LTE, or WLAN standard, e.g. an IEEE 802.11 type standard. The processor may be further connected to a (graphical) user interface 212 enabling the user to interact with the mobile device and client applications. The (graphical) user interface may be configured as a touch sensitive screen. In another embodiment, the user interface may include an imaging module that is capable of interpreting 3D gestures.

In an embodiment, the antenna module 214 may be implemented as a separate module which can be mechanically and communicatively connected to the mobile device. In another embodiment, the antenna module may be part of a dedicated mobile location device. The antenna module includes a directional antenna 224, preferably a planar directional antenna structure, connected to a radio module 218 and a processor 216. As will be described hereunder in more detail, the antenna module in combination with a software application executed on the mobile device, may configure the mobile device as a mobile location device for locating one or more animals wearing an activated sensor device 232.

The processor of the antenna module 216 may support one or more protocol stacks, e.g. a Zigbee protocol stack, for creating a low-power ad-hoc radiofrequency network. Protocols suitable for the embodiments in this application may include Zigbee (IEEE 802.15.4), Z-Wave, WiFi (IEEE 802.11), Sigfox, Neul, LoRaWan, etc. The processor may be configured to control a radio module 218 which is connected to the directional antenna structure 224.

In an embodiment, the directional antenna structure may have a planar Yagi-type antenna structure including a receiver electrode 226 (e.g. a dipole type receiver electrode) connected to transceiver 218, a reflector electrode 228 and a plurality of director electrodes 230 for concentrating the electromagnetic energy into a beam-shaped radiation field or receive field. The antenna structure may be designed as a planar antenna including a planar support and thin-film metal electrodes, including a transmitter, a reflector and one or more directors, arranged to generate a highly directional receive pattern. In an embodiment, the direction antenna and the RF transmitters may be designed to operate in between 1-10 GHz, preferably between 2-6 GHz, more preferably at frequency bands around 2.4 GHz or other frequency bands which may be used for operating the monitoring system of FIG. 1.

The planar directional antenna may be designed to have a directional receive pattern of a substantial sensitivity in forward direction so that—if a user points the main axis of the directional receive pattern in the direction of an activated sensor device 232—the antenna is able to detect beacon signals of a sensor device located within the receive pattern.

In some embodiments, the antenna module may include an RFID reader 222 connected to an antenna coil 221 that allows the antenna module to read an RFID tag 244 connected or associated with the sensor device. The antenna module may further include a (chargeable) battery (not shown) and one or more sensors 220. In an embodiment, the one or more sensors may include an accelerometer, e.g. a 3-axis accelerometer for determining the orientation and/or movements of the mobile device when the mobile device is in use. In another embodiment, the one or more sensors may include a magnetometer for determining a reference direction that can be used during the process of locating an activated sensor device.

In an embodiment, the antenna module, including the elongated planar support member, supporting the directional antenna structure, comprises a fixating structure for mechanical fixating the antenna module to the mobile device. For example, in an embodiment, the fixating structure may include flexible clamping members connected to the support member configured to removable fixate the mobile device to the support member. A housing for the electronics components of the antenna module may be attached to the back of the support member. An example of such embodiment is described in more detail with reference to FIG. 4A.

The processor of the antenna module 216 may be connected via a data bus to one or more I/O interfaces 215 for establishing data communication between the antenna module and the mobile device. In an embodiment, the I/O interfaces include a hardwired interface, including e.g. an electrical connecter, e.g. an USB or a Firewire connector, for connecting the mobile device to the processor of the antenna module. In another embodiment, the I/O interfaces include a wireless interface, e.g. a Bluetooth interface or a NFC interface.

The processor of the antenna module 216 may communicate via the one or more I/O interfaces with the mobile device 202. A client application 206 stored in the memory 210 of the mobile device and executed by a processor of the mobile device may control the antenna module, e.g. instruct the controller of the antenna module to activate the antenna module in a receive modus wherein the antenna has a directional receive pattern for detecting an RF transmitter transmitting beacon signals at a predetermined transmission frequency, to detect signals of one or more transmitting sensor devices and to extract information from the detected signals. Information associated with detected beacon signals may include: signal strength, signal direction and information carried by the signal, e.g. a sensor ID and/or other information.

In an embodiment, a sensor device may broadcast beacons signals at transmission levels between −20 and 10 dBm, preferably between −10 dBm and 0 dBm. In an embodiment, a transmission level of −8 dBm may be selected. Selection of a transmission level in these ranges provide a signal that is strong enough to be receptacle by an antenna module at a distance between 250 and 500 meters, while still being power efficient. Further, in an embodiment, a broadcast interval between 1 and 10 Hz, preferably between 2 and 4 Hz. In an embodiment, a broadcast interval of 3 Hz may be selected. A broadcast interval in this range allows sufficient signal reception by the antenna module so that an excellent user experience can be obtained, while still being power efficient. Additionally, these broadcast intervals provide efficient RF bandwidth allowing many sensor devices to broadcast simultaneously. A sensor device may be activated to broadcast between a duration from 0.5 to 8 hours, typically between 2 and 4 hours, providing sufficient time to locate the animal while still power efficient.

The client application may process the information received from the antenna module and generate a graphical user interface which allows a user to use the mobile device as a mobile location device for locating a transmitting sensor device.

Additionally, the client application may be configured to communicate with a server of the monitoring system (as e.g. described with reference to FIG. 1), e.g. to receive information about the wireless sensor devices that are monitored (e.g. an identifier and, optionally, the physical status of an animal); to select a wireless sensor device; and, to instruct the server of the monitoring system to activate the selected wireless sensor device to broadcast beacons signals for a predetermined time. The client application may connect to the server of the monitoring system via the wireless interface of the mobile device using e.g. a 4G or 5G wireless Internet connection.

FIG. 2C depicts a format of data transmitted in a beacon signal. The information may include a plurality of data fields, wherein one data field may include a sensor ID 250 (e.g. (part of) the MAC address to the sensor device). A beacon signal may also include one or more data fields comprising: a sequence number 252 (which is incremented for each further beacon signal), a time stamp 254, state information 256 associated with the physiological state of animal or the physical state object that is monitored by the sensor device; and/or, status information of the sensor device, e.g. information regarding the power level at which the beacon signals are transmitted by the wireless sensor device. In particular, when a user uses the mobile location device to activate of one or more sensor devices, he may determine that an activated sensor device broadcasts beacon signals that includes information about the state of the animal or object to which the wireless sensor device is attached to. For example, the data field comprising the state information may comprise a bit value wherein each value is indicative of a predetermined (physiological) state of the animal or object. This state may be the behavior and/or physiological state (state1, state2, state3, . . . ) of an animal as determined by the server processor using the sensor data and stored in the database of the server. The state of the animal, e.g. active, sleeping, ruminating, *Oestrus*, etc., may help the user to identify the animal in a group of animals during a location process.

FIG. 2D depicts a use of the mobile location device according to an embodiment of the invention. This figures illustrates a mobile location device 200 and an RF transmitter (e.g. a wireless sensor device) as described with reference to FIG. 2A-2C wherein the RF transmitter comprises an RF antenna 248 for transmitting beacon signals and an RFID tag including RFID antenna 244 (a magnetic coil) and wherein the mobile location device comprises an RF receiver connected to a directional receive antenna 230 and an RFID tag reader comprising an RFID antenna 221 (a magnetic coil) that is configured to magnetically couple with the RFID antenna of the RFID tag.

A client device executed by a processor in the mobile location device may control the RF receiver and the RF tag reader on the basis of the orientation of the device. For example, in an embodiment, an orientation sensor in the mobile location device (e.g. an accelerometer in the antenna module or in the mobile device) may be used to determine if the mobile location device is in a first orientation (e.g. the plane of the mobile location device in the x-y plane as depicted in FIG. 2D (I) or in a second orientation (e.g. the plane of the mobile location device is in the z-y plane as depicted in FIG. 2D (II). In the first orientation, the client device may activate the RF antenna for locating an activated RF transmitter. This mode may be referred to as the RF scanning mode of the mobile location device. In the second orientation, the client device may activate the RFID tag reader for reading the (passive) RFID tag associated with a located RF transmitter. This mode may be referred to as the RFID mode of the mobile location device. The modes may be activated on the basis of the orientation of the mobile location device, allowing very efficient and user-friendly control of the device. For example, in a first stage a user may use the RF scanning mode to locate an activated RF transmitter and once the RF transmitter is located, the user may read-out the RFID tag of the located animal using the RFID mode orienting the device in a second orientation. As will be described hereunder in more detail, the RFID tag associated with the RF transmitter may be implemented as part of an attaching means for attaching the RF transmitter (or a sensor device including an RF transmitter) to an animal or an object.

The combined RF receiver and RFID reader in the location device allows very efficient registration of the sensor devices with the monitoring system. For example, new sensor devices may be registered with their sensor ID in the database of the server. A user may subsequently, use the mobile localization device in the RF scanning mode to activate a new sensor device so that it starts transmitting beacon signal that can be detected by the directional receive antenna of the mobile localization device. Upon reception of the beacon signals, the mobile localization device may receive beacons signals comprising the sensor ID (SID) of the sensor. Then, the user may switch the mobile location device in the RFID mode and read-out the animal ID (the CID). The user may then use the mobile location device to send the sensor ID and the read animal ID to the server and instruct the server to register the CID with the CID. This way, the sensor ID and the animal ID are correctly registered in the database of the monitoring system.

Hence, in an embodiment, the registration process may include to the steps of:
- using the mobile location device to request the server of the monitoring system to activate a sensor device that needs to be registered in the database of the monitoring system;
- the mobile device receiving beacon signals of the activated sensor device, the beacons signal including a first ID identifying the sensor device;
- using an RFID reader of the mobile location device to read-out an RFID tag associated with the sensor device, the RFID tag including a second ID identifying an animal or an object to which the sensor is attached to or is going to be attached to;
- sending the first ID and second ID to the server of the monitoring system and requesting the monitoring system to register the second ID with the first ID in the database of the monitoring system.

This registration process is particular useful when registering large numbers (e.g. more than thousand) sensor devices and associated animal IDs in the system.

FIGS. 3A and 3B depict an exemplary implementation of a sensor device according to an embodiment of the invention. In particular, FIG. 3A depicts a sensor device comprising a sensor housing 302, e.g. a molded sensor housing, for housing the sensors, RF electronics and a battery. The sensor housing may comprise an attaching structure 306,308 that is configured to attach the housing to a body part of an animal. The attaching structures may comprise a (flexible) receiving structure 306 connected to the sensor housing, wherein the receiving structure is configured to receive an attaching plug 304. The sensor device may be affixed to the animal by clamping skin of an ear of an animal between the flexible receiving structure and the attaching plug.

In an embodiment, the attaching plug may comprise a RFID tag, preferably a passive RFID tag, comprising a magnetic coil 312 connected to an integrated chip 314 that includes electronics for controlling the tag. The attaching plug may serve as a housing for the RFID tag, which can be read out via magnetic coupling between the coil of the RFID tag and a coil of the RFID reader in the antenna module. The RFID tag may include a memory comprising data for identifying the animal, e.g. a unique identification number, place and time of birth, gender, owner, etc. The information may include registration information of the animal as required by (inter)national legislation. Additionally, the attaching plug may include optically readable information, e.g. a QR code 310, which can be read using e.g. an optical scanner or a camera.

The receiving structure of the attaching means may be shaped such that the attaching plug can be resiliently clamped in the receiving part as shown in FIG. 3B. The sensor tag may be attached to the ear of an animal by placing the receiving part at one side of the ear of the animal and pressing the attaching plug on the other side of the ear into the resilient receiving part. The receiving structure may include a lid 308 to hold the plug in a fixed position. Hence, the tag sensor may be attached to the animal by clamping part of the soft skin part of the ear of the animal between the receiving part and the attaching plug. The resilient force of the clamp is configured such that it will not harm or damage the skin of the animal.

It is submitted that FIGS. 3A and 3B depict only one example of attaching the sensor tag to the animal. Many other ways of attaching a sensor device to a body part of an animal may be used without departing from the invention.

FIG. 4A depicts an exemplary implementation of mobile location device according to an embodiment of the invention. As shown in FIG. 4A, the device may include an elongated planar support member 400, supporting a directional antenna structure 402, a mobile device 410 attached to the support member on the basis of (mechanical) clamping structures 406,408 and a housing 404 comprising the electronics for controlling the directional antenna and an electrical interface with the mobile device. The mobile device may comprise a software application that is configured to use antenna module connected to the mobile device as a mobile location device. control the antenna module, to generate a graphical user interface for the user of the mobile location device and to communicate with a server of the system that monitors wireless sensor device.

In an embodiment, the antenna structure may include thin-film metal antenna electrodes. In an embodiment, the antenna electrodes may include a transmitter electrode, e.g. a dipole transmitter electrode, a reflector electrode and a plurality of director electrodes arranged to produce a directional receive pattern. In an embodiment, the directional receive pattern may point in a direction parallel to the longitudinal axis 405 of the pointing device. This direction may be referred to as the pointing direction 403 of the mobile location device. Typically, during the operation of the device, the user holds the device in one hand and points the device in a direction of an area which the user would like to scan for activated sensor devices. A user may scan areas around him by pointing the location device in different directions and examine the reading on the graphic user interface 409 of the mobile device in order to determine if in a certain pointing direction one or more activated sensor devices are located. To that end, during scanning the user may typically holds the mobile pointing device substantially horizontal, while changing the pointing direction. Hence, during a scanning operation the user holds the device such that the plane of the mobile device is substantially parallel to the ground plane.

Figure 5:
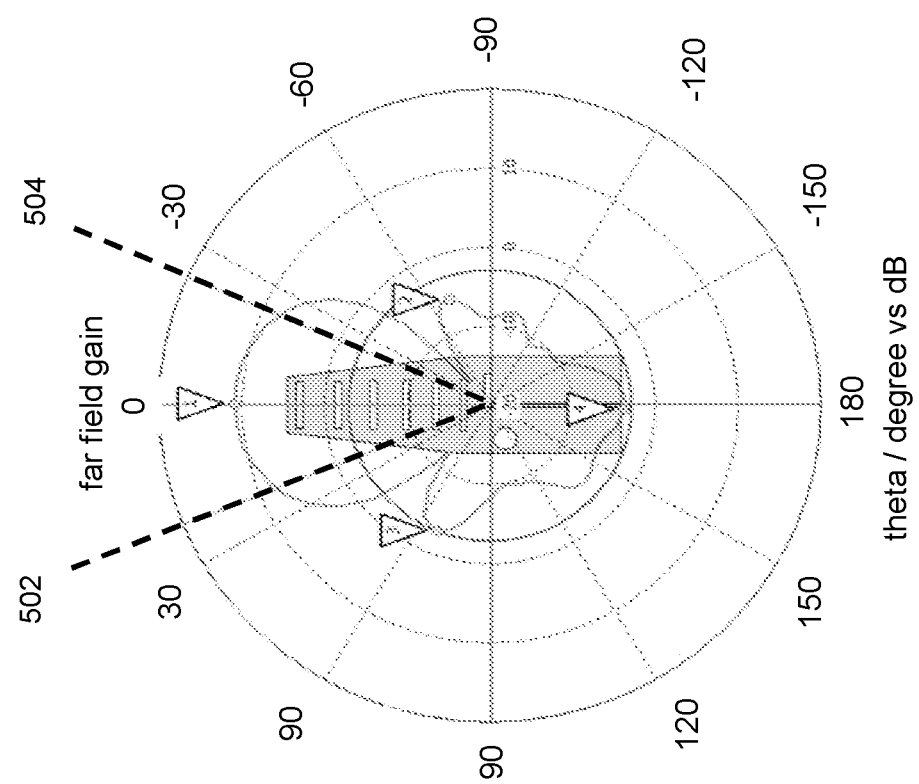
FIG. 5 represents a polar graph of a radiation field of an antenna module according to an embodiment of the invention.

The number of director electrodes determine an opening angle of the antenna as well as the amplification of the antenna. Increasing the number of directors will increase the openings angle and the amplification in the main direction of the antenna. For example, for each director the opening angle of the radiation field/receive field may increase with approx. 2 degrees per director and the gain may increase with 0.5 dB per director. As shown in the polar graph depicted in FIG. 5, an implementation comprising 6 directors results in a forward radiation field (receive field) with a gain (sensitivity) of 10 dB and an opening angle 502,504 of approximately 25 degrees.

In an embodiment, the antenna module may include an antenna extender for increasing the directionality and the gain of the antenna. As shown in FIG. 4B, the antenna module $412_{1,2}$ may include an antenna extender $414_{1,2}$ which may be fixed, e.g. in a sliding structure, to the (back of the) planar support member $400_{1,2}$ of the directional antenna. FIG. 4B depicts an antenna module $412_1$ including an antenna extender $414_1$ in a non-extended state. In this state the antenna extender is located in a non-radiative area behind the antenna of the antenna module. This way the antenna will have a direction receive pattern of first dimensions. FIG. 4B further depicts an antenna module $412_2$ including an antenna extender $414_2$ in an extended state. In this state, the antenna extender is located in the radiative area in front the antenna of the antenna module. In the extended state, the antenna extender is slid outwardly so that a predetermined number of director electrodes is added to the antenna structure, thereby effectively extending the antenna of the antenna module. Hence, the antenna extender will effectively increase the number of directors of the antenna so that a receive pattern with an increased directionally and range is formed. For example, the extender may add a predetermined number, e.g. 10 extenders, to the antenna thereby increasing the gain of the antenna to approx. 15 dB and decreasing the opening angle of 20 degrees.

As already explained earlier, beacon signals transmitted by activate sensor devices will exhibit large fluctuations, so it will be difficult to generate a reliable distance estimate on the basis of the beacon signals that is suitable for display to a user. The sensor device may be triggered to broadcast a beacon signal which can be detected by the antenna module. Hence, when a sensor device of an animal that needs to be located connects to a base station, the monitoring system may detect the connection and send a message via the connection to the sensor device, instructing the sensor device to start broadcasting. The message may include different parameters, including (but not limited to): a start time, a broadcast duration, a broadcast channel, a broadcast interval and/or a broadcast transmission level. During a broadcast, a sensor device may broadcast beacon signals which may include: an identifier (e.g. the MAC address) of the sensor, a transmission level and/or a sequence counter.

As the antenna of the sensor device is not a monopole, its transmission strength depends on direction wherein the total variation of the signal due to the radiation pattern is approximately 10 dB. Further, the radio signal is weakened by all objects in the path of the signal. Especially the head and body of animals absorb the signal. For example, when a user of the location device is walking amidst cows wearing a RF transmitter in the cowshed or pasture, the absorption of the signals by cows causes variations of 10 dB or more. Hence, extraction of location information from the beacons signals and presentation of the location information of multiple sensor devices to the user is not evident.

In order to address these problems, the client device receiving beacon signals from the antenna module will process the information in order to derive a reliable estimate of the location of a transmitting sensor device relative to the location of the user of the mobile location device the client device will process the information of the beacon signals in a predetermined way.

Figure 6A:
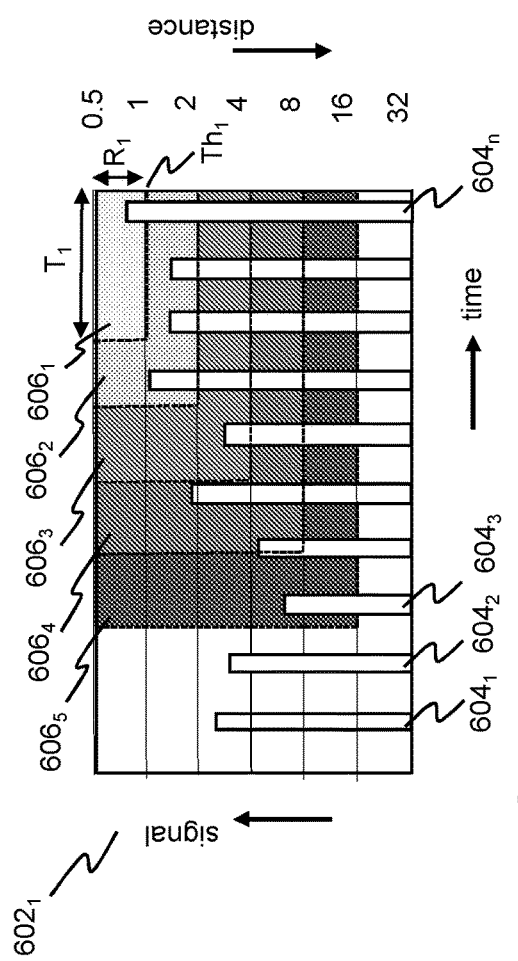
FIGS. 6A and 6B schematically depict the processing of beacon signals of a sensor device according to an embodiment of the invention.
Figure 6B:
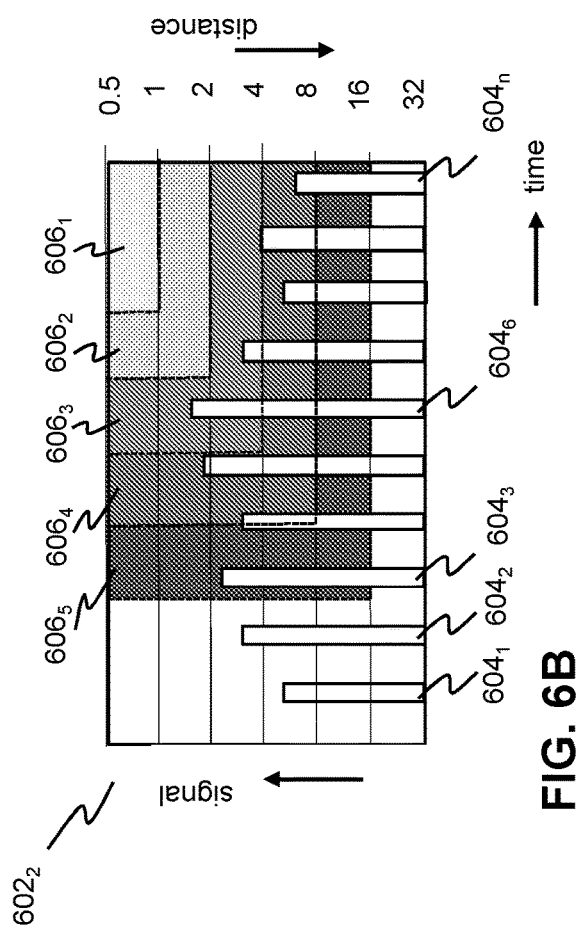

FIGS. 6A and 6B schematically depict the processing of beacon signals transmitted by a sensor device according to an embodiment of the invention. In particular, FIGS. 6A and 6B depict two examples $602_{1,2}$ of processing of a time series of beacons signals $604_{1-n}$ transmitted by two different sensor devices. When the antenna module of the mobile device receives beacons signal of sensor devices, the client device may periodically or regularly sample time series of beacon signals (i.e. a number of beacon signals within a predetermined time period). For example, in FIGS. 6A and 6B a time series may include 10 beacon signals of fluctuating signal strengths. Beacon signals of different radio transmitting devices may be separated by the client device on the basis of an identifier of other information in the beacons signals.

The client application executed by the mobile device may use an algorithm to determine an estimate of the distance between the mobile receiving device and a radio transmitting device on the basis of the signal strengths and/or signal quality of the beacon signals in a time series.

In an embodiment, a distance estimation on the basis of a signal strength and/or signal quality of the beacon signal may be based on the log-distance path loss model for free space. In one embodiment, the model may be based on a Link Quality Indicator (LQI), in another embodiment, the model may be based on a received signal strength indication (RSSI). The distance estimation of a beacon signal may be calculated by a processor in the antenna module on the basis of signal information from the RF receiver module. The LQI is a metric that is supported by wireless chips, which are based on the 802.15.4 Zigbee standard.

For determining a distance estimate d based on an LQI metric the following expression may be used:

$$d = 2^{\frac{LQI-3(tx+A)-LQI\_1m}{LQI\_2x}}$$

wherein the parameter A represents a sensitivity of the antenna in dB, the parameter LQI_1 m represents a link quality for a sensor device broadcasting at a distance of 1 meter at a transmission level of 0 dB (in the strongest direction) and wherein LQI_2× is the change in LQI units when doubling the distance. For a sensor device as described with reference to FIGS. 2 and 4 the LQI_1 m may be approximately 190 and LQI_2× by −18 LQI units. The transmission level tx (in units of dB) is also taken into account. The conversion from LQI to dB has been determined to be LQI=3*dB.

For determining a distance estimate d based on an RSSI metric the following expression may be used:

$$d = 2^{\frac{RSSI-tx-RSSI\_1m}{6}}$$

where RSSI is received signal strength indication (in units of dB), tx the transmission level in dB and RSSI_1 m the signal strength at 1 m when broadcasting at a transmission level of 0 dB (in the strongest direction).

In order to deal with the fluctuations in the distance estimates, a data processing algorithm may be used that evaluates the distance estimates in order to derive a stable and reliable signal that is representative of distance range in which an activated sensor device is located. FIGS. 6A and 6B illustrate the working of the evaluation of the distance estimates according to an embodiment of the invention. When a user points the location device in a direction where activated sensor devices are located, the location device may detect beacon signals of the activated sensors and use a signal parameter (LQI or RSSI) associated with each beacon signal to determine a time series of distance estimates. This way, based on the identifiers in the beacon signals, one or more time series of distance estimates for a broadcasting sensor device can be determined.

FIG. 6A shows a time series of distance measures $604_{1-n}$ measured by a mobile location device that uses an antenna module as described in this application. In order to produce a stable and reliable distance signal that can be visualized, an algorithm may define a plurality of time windows, wherein each time window is associated with a time duration, a distance range and a distance threshold. The plurality of time window may be of increasing time duration and increasing distance range, e.g.: a first time window $606_1$ of time duration $T_1$, distance range value $R_1$ (very close) and distance threshold Th1, a second time window $606_2$ of time duration $T_2$, distance range value $R_2$ and distance threshold Th2, a third time window $606_3$ of time duration $T_3$, distance range value $R_3$ and distance threshold Th3, a fourth time window $606_4$ of time duration $T_4$, distance range value $R_4$ and distance threshold Th4, a fifth time window $606_5$ of time duration $T_5$, distance range value $R_5$ and distance threshold Th5, etc. The time windows may be defined relative to a reference time Tr. Here, the distance ranges and distance threshold may increase exponentially.

The algorithm uses the distance thresholds in order to determine the distance estimates that are located within one or more time windows. Thereafter, the algorithm may determine that an RF transmitting device is within a range that is equal to the distance range in which the shortest distance estimate is located. For example, in FIG. 6A the algorithm may determine that distance estimates $604_{3-n}$ are located in one or more time windows and that the smallest distance estimate $604_n$ is located in time window $606_1$ which is associated with distance range 1. The algorithm thus determines that the sensor device is within distance range 1.

Similarly, FIG. 6B defines a time series of distance estimates of a different sensor device, which was measured in the same time interval as the distance estimates of FIG. 6A. In this case, the algorithm may determine that the smallest distance estimate of the distance estimates $604_{3-n}$ that are located within one or more time windows is distance estimate $604_6$. This distance estimate is located in the time window that is associated with distance range 3. Hence, in that case, the algorithm may determine that the sensor device is within distance range 3, i.e. further away than the sensor device of FIG. 6A.

Hence, the algorithm may use a set of discrete distance ranges. This way, variations in the signal strength due to motion of the sensor devices may be approx. 10 dB so a step between 8 to 12 dB between the distance ranges results in a visually stable signal that is suitable for presentation to the user. Smaller steps will result in a volatile presentation that suggest the distance is changing while this variation is due to sensor and cow motions. When the sensor device is located further away, its distance is less likely to change fast with a factor 2 or more. The larger the distance range, the longer an animal will stay within this the range. Hence, a larger time window for a longer distance range will result in a more stable presentation.

Hence, the client application executed on the mobile device may receive a time series of signals from the antenna module wherein the signals are indicative of a signal strength and/or signal quality, e.g. an RSSI or LQI value. The client application may then transform each signal into a distance estimate using a predetermined expression linking a distance estimate to a measured signal strength and/or signal quality and determining a signal that is suitable for visual presentation by processing the determined time series of distance estimates on the basis of the algorithm as described with reference to FIGS. 6A and 6B.

Figure 7:
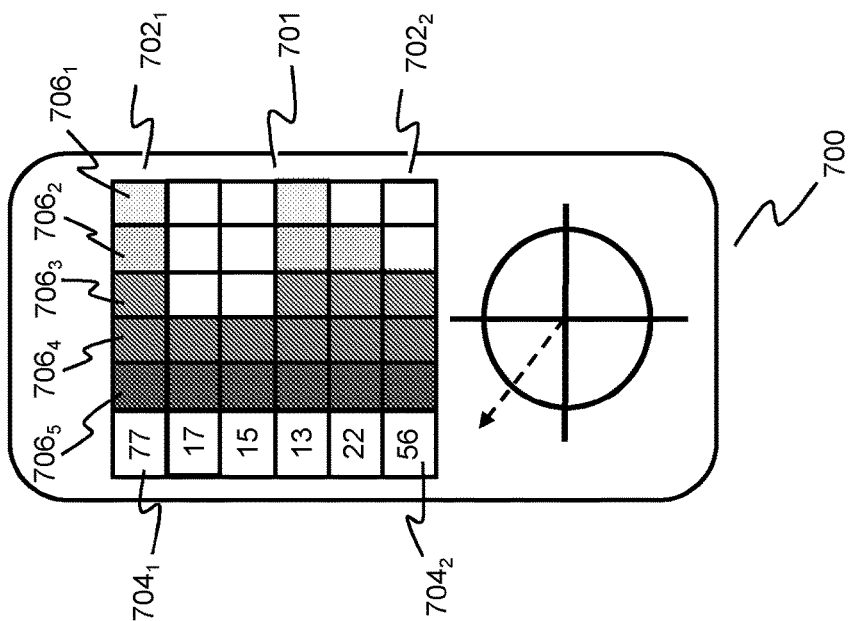
FIG. 7 depicts part of a graphical user interface generated by a mobile location device according to an embodiment of the invention.

FIG. 7 depicts part of a graphical user interface generated by a mobile location device according to an embodiment of the invention. The graphical user interface 701 may be generated by the client application that is executed on a mobile device 700 to which an antenna module is connected. The client application may generate the GUI on the basis of the signal calculated by the algorithm. As shown in the figure, the graphical user interface may include one or more visual range indicators $702_{1,2}$ for detected beacon signals transmitted by a sensor device. A visual indicator may include visual indicators $706_{1-5}$ representing the discrete distance ranges that the algorithm uses when it processes the signals measured by the antenna module. For example, the visual indicator may include a set of range indicators, which are activated when the algorithm determines that a sensor device is within one of the distance ranges.

For example, if the algorithm signals the client device that the sensor devices is within range 1 (as shown in FIG. 6A), then the client device may generate a visual indicator $702_1$, which may include a sensor device identifier $704_1$ and at least a distance range indicator $706_1$ associated with distance range 1 and, optionally, all other distance range indicators $706_{2-5}$ that define the distance ranges that are larger than distance range 1. Similarly, if the algorithm if the algorithm signals the client device that the sensor devices is within distance range 3 (as shown in FIG. 6B), then the client device may generate a visual indicator $702_2$ which includes a sensor device identifier $704_2$, and at least a distance range indicator $706_3$ associated with distance range 3 and, optionally, all other distance range indicators $706_{4,5}$ that define the distance ranges that are larger than distance range 3.

The process of detecting beacon signals, determining distance estimates, determining a signal that is suitable for visualization and generating a graphical user interface on the basis of the signal may be repeated periodically, e.g. every 100 ms. Hence, when a sensor device moves out of a range of the location detector, the graphical user interface does not immediately sets the signal to zero, but it fades slowly. This fade results in a smoother presentation that also hides the signal fluctuations due to sensor device motion and animal motion. The fade-out time is longer for larger distance ranges.

Figure 8:
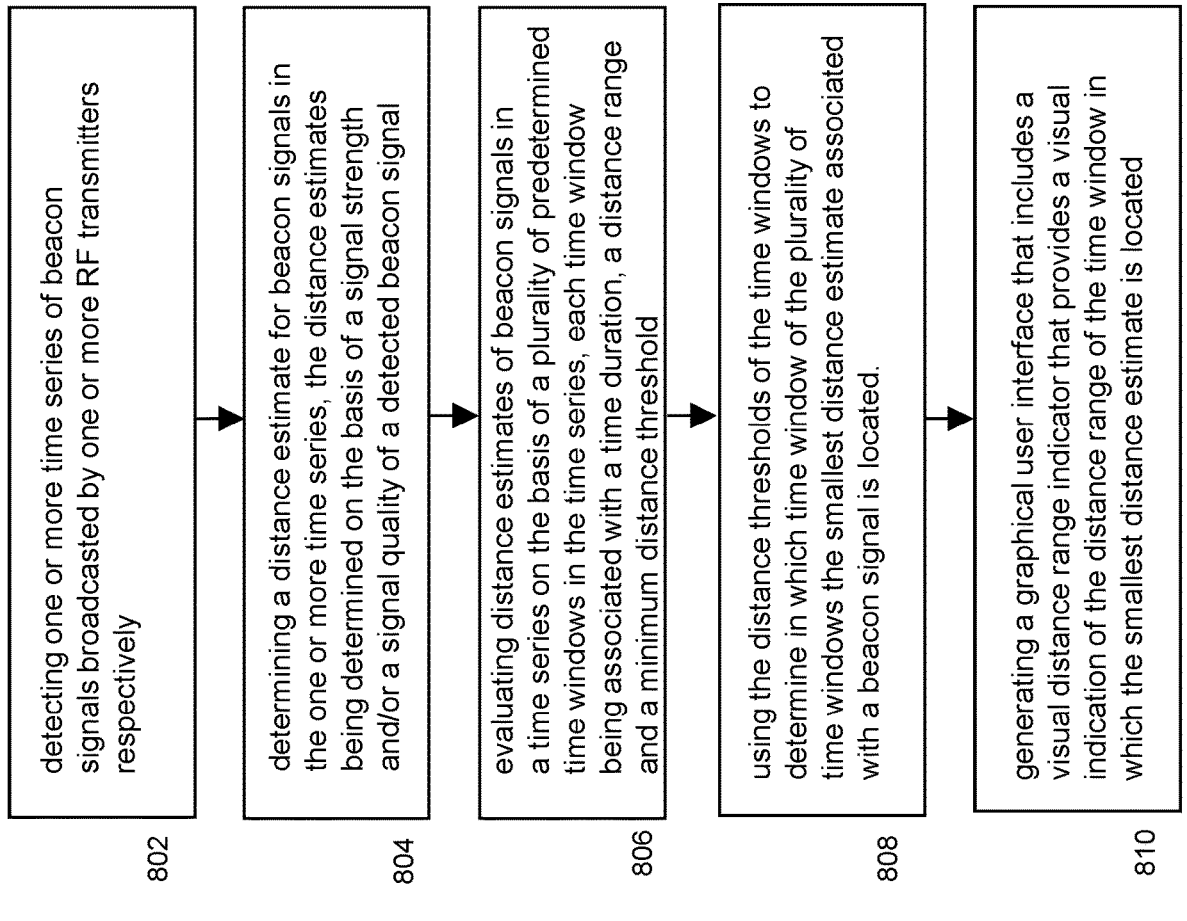
FIG. 8 depicts a method of processing beacon signals by a mobile location device according to an embodiment of the invention.

FIG. 8 depicts a method of processing beacon signals by a mobile location device according to an embodiment of the invention. The processing may be executed by a client application that is executed by a processor of a mobile device, e.g. a smart phone, that is connected to an antenna module as described with reference to FIGS. 2, 3 and 4.

The processing may include the steps of: an RF receiver of the antenna module receiving one or more time series of beacon signals broadcasted by one or more RF transmitters worn by animals respectively (step 802) and a processor in the antenna module determining a distance estimate for each beacon signal of the one or more time series on the basis of a signal strength and/or a signal quality associated with a detected beacon signal (step 804). The processor in the antenna module may generate the distance estimates on the basis of signal strength/quality information determined by the RF module in the antenna module.

The distance estimates of the beacon signals in the one or more time series may be transmitted via the mobile device interface to the mobile device, wherein an client application executed by a processor of the mobile device may evaluate the distance estimates on the basis of a plurality of time windows. Here, each time window is associated with a time duration and a distance range value (step 806). The plurality of time windows may (at least) include a first time window of a first time duration, a first distance range and a first distance threshold and a second time window of a second time duration and a second distance range wherein the time duration, the distance range and the distance threshold of the first time window are smaller than the time duration, the time distance and the distance threshold of the second time window.

The evaluation of the distance estimates of the beacon signals may include: using the distance thresholds of the of the time windows to determine in which time window the smallest distance estimate associated with a beacon signal is located (step 808). The RF device to be located is assumed to be within the distance range associated with the thus determined time window. Thereafter, the client application may generate a graphical user interface, e.g. on a display of the mobile device, wherein the graphical user interface includes a visual distance range indicator, wherein the distance range indicator provides a stable and reliable visual indication of the distance range of the time window in which the smallest distance estimate is located (step 810).

FIG. 9 depicts a schematic of mobile location device according to another embodiment of the invention. The location device in this figure includes at least two antenna's, wherein the mobile location device is configured to accurately determine a direction of an activated (broadcasting) sensor device. As shown in FIG. 9, the location device may include an antenna module including an elongated planar support member 902 supporting an antenna structure $906_{1,2}, 908_{1,2}$ including at least two directional antenna's, a first planar directional antenna structure $906_{1,2}$, and a second planar directional antenna structure $908_{1,2}$. The location device may further comprise a housing (not visible) connected to the back of the support member comprising electronics for controlling the antenna module and a mobile device 904 connected to electronics of the antenna module. Each antenna may include thin-film metal antenna electrodes, including a transmitter electrode, e.g. a dipole transmitter electrode, a reflector electrode and a plurality of director electrodes arranged to produce a directional receive pattern. The two planar directional antennas may be connected to an antenna controller as shown in FIG. 10. The controller may include two transceivers, wherein each transceiver is connected to an antenna so that it can detect an RF signal of an activated sensor device.

FIG. 10 depicts an implementation of (part of) an antenna module according to an embodiment of the invention. As shown in this figure, the antenna module 1000 may comprise (at least) a first and second directional antenna $1002_{1,2}$ connected to a microstrip coupler structure 1004. The microstrip coupler structure may include first and second input microstrips $1006_{1,2}$ and first and second output microstrips $1008_{1,2}$ connected to a circular microstrip. The input and output microstrips may be connected to the circular microstrip at positions along the perimeter such that the when the first and second directional antenna receive a first and second signal respectively, the output signal at the first output represents a first combination, e.g. a sum, of the first and second received signal and the output signal at the second output represents a second combination, e.g. a difference, between the first and second received signal.

In particular, as shown in FIG. 10, the circular microstrip structure may include a top half microstrip part and a bottom half microstrip part, wherein both the top half microstrip part and the bottom half microstrip parts may each have a length of three quarter wavelength, wherein the wavelength is the wavelength at which the first and second directional antenna detect the beacon signals. The input and output microstrips may be located one quarter wavelength away from each other around the top half microstrip. When the antennas are configured to receive two in phase signals, e.g. a signal of an activated RF transmitter, the first output port $1008_1$ will output the sum of the two signals and the second output port $1008_2$ will output the difference of the two signals. The first and second output of the circular coupler may be connected to two RF receivers $1010_{1,2}$ for transforming the analogue signals, a sum signal and a difference signal, into a digital signal, which subsequently may be processed by a processor 1012.

The summing and difference signals may be achieved by arranging the input and outputs at a predetermined manner along a part of the circular microstrip structure. For example, in the embodiment depicted in FIG. 10, the first input, the first output, the second input and the second output are located along the top part of the circular microstructure wherein the distance between the input/output or output/input is a quarter wavelength. The implementation depicted in FIG. 10 is referred to as a rat-race coupler. The sum and difference signals may be used to accurately determine a direction of a broadcasting RF transmitter, e.g. an activate sensor device as described with reference to FIGS. 1 and 2. The use of these output signals for locating an RF transmitter is further explained with reference to FIGS. 11 and 12.

Figure 11:
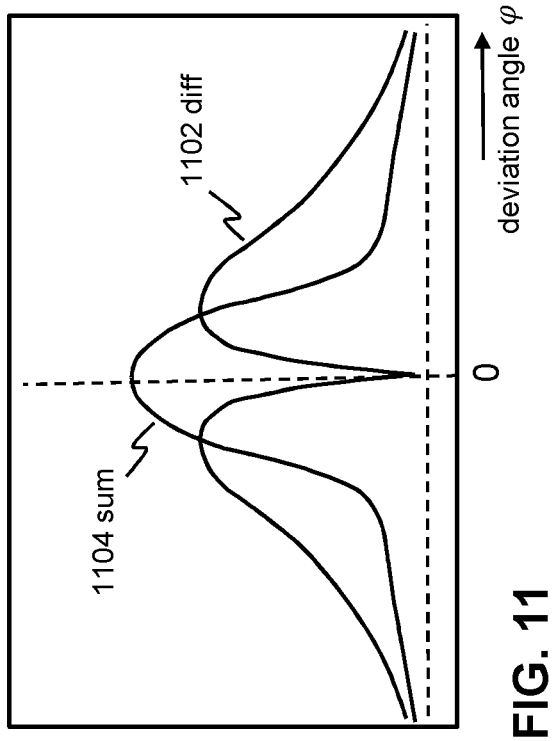
FIG. 11 depicts signals for determining a direction of broadcasting RF device according to an embodiment of the invention.

FIG. 11 depicts signals for determining a direction of broadcasting RF device according to an embodiment of the invention. In particular, FIG. 11 depicts a sum signal 1104 and a difference signal 1102 of an activated sensor signal at relatively large distances as a function of the so-called deviation angle $\varphi$, i.e. the angle between a first pointing direction of a mobile location device pointing exactly in the direction of a broadcasting RF device and a second pointing direction of the mobile location device pointing in a direction that deviates from the first pointing direction (wherein the axis of the first and second pointing directions are (approximately) in the plane of the mobile cell). When the deviation angle is zero, the pointing direction coincides with the direction in which the activated sensor device is located. In that case, the differences signal is zero and the sum signal is maximum. As shown in the figure, when the deviation angle deviates from zero in the negative or positive direction, the difference signal increases very steeply, while the sum signal decreases relatively slowly. Hence, based on these two signals, in particular the difference signal, the direction of the activated sensor device can be determined accurately using a graphical user interface that is capable of generating a first graphical indication of the difference signal and a second graphical indication of the sum signal.

Figure 12A:
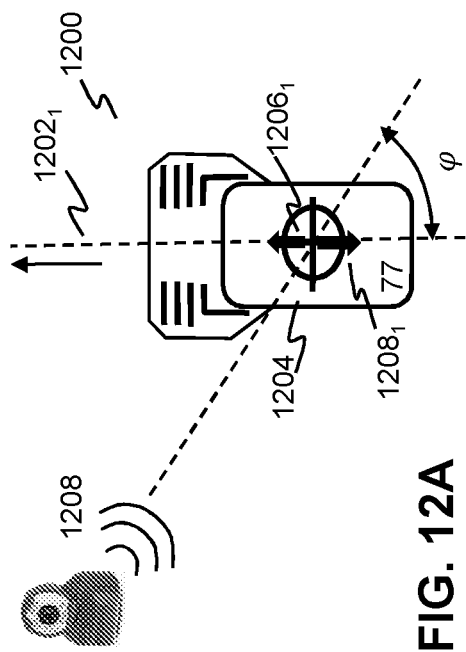
FIGS. 12A and 12B depict a graphical user interface for determining a signal direction using a location device according to an embodiment of the invention.
Figure 12B:
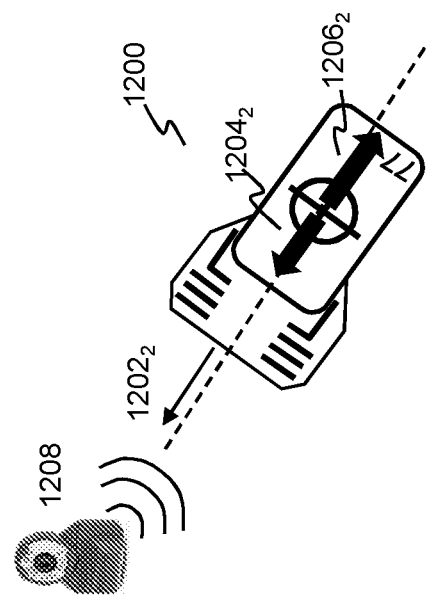

FIGS. 12A and 12B depict a graphical user interface for determining a signal direction using a location device according to an embodiment of the invention. As shown in FIG. 12A, in a first state, the user may point the location device $1200_1$ in a first pointing direction $1202_1$ which is associated with a deviation angle $\varphi$. In that case, the client application may use the received difference and/or sum signal(s) to generate a graphical user interface (GUI) 1204 that enables a user to determine the direction from which an activated sensor device is transmitting. The GUI may include a first graphical indicator $1206_{1,2}$ representing the signal strength of the sum signal and a second graphical indicator $1208_{1,2}$ representing the signal strength of the difference signal. For example, the graphical indicators may have the form of an arrow with an axis parallel to the main axis of the pointing device.

In an embodiment, the appearance (e.g. the dimensions and/or the colour) of the graphical indicators, e.g. a first appearance of the first graphical indicator and a second appearance of the second graphical indicator, may represent a measure of the signal strength of the signal received by the pointing device. The first appearance may change depending on the signal strength of the sum signal and the second appearance may change depending on the difference signal. Thus, if a user points the location device in a first pointing direction of a deviation angle $\varphi$ both the first and second graphical indicator may be relatively small. Then, if the user changes the pointing direction towards the activated sensor device, the first and second graphical indicators may change of appearance, e.g. change in size and/or change in colour. For example, as shown in FIG. 12B, in a second state, the user may point the location device $1200$ in a second pointing direction $1202_2$, which is associated with a deviation angle $\varphi=0$. In that case, dimensions of the first and second graphical indicators may be maximal or have a second colour different from a first colour in the first state.

Figure 13B:
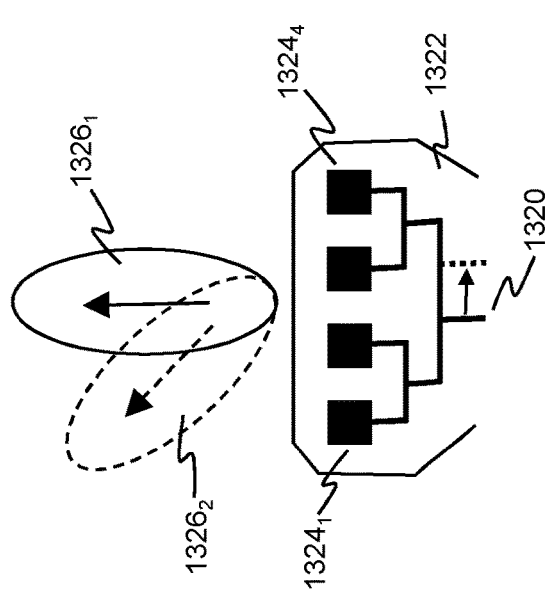
FIGS. 13A and 13B depict examples of directional antenna elements that can be used by the embodiments in this disclosure.
Figure 13A:
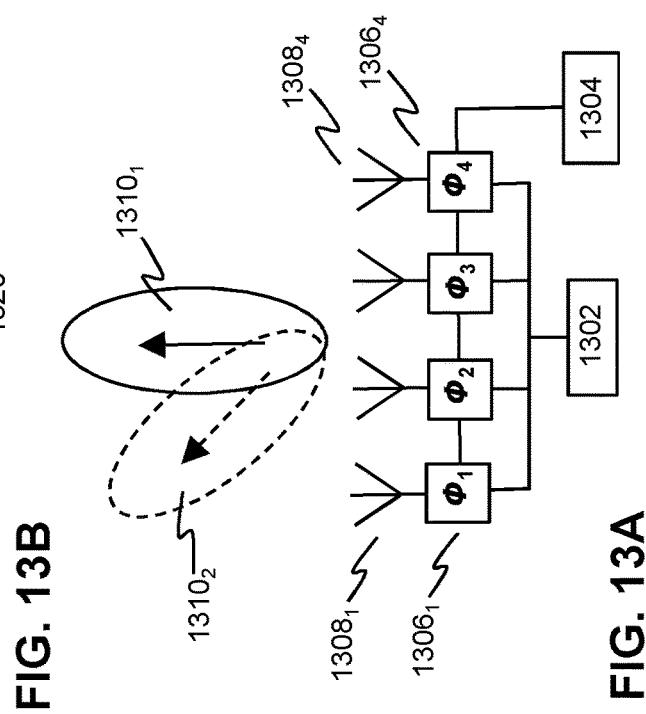

Although the figures depict antenna yagi-type planar antenna structures in including one or two antenna's other directional antenna structures are also foreseen. FIGS. 13A and 13B depict examples of directional antenna elements that can be used by the embodiments in this disclosure. For example, FIG. 13A depicts a schematic of a linear phased array antenna, including a microwave input 1302, phase shifters $1306_{1-4}$ coupled to a phase controller 1304 and an array of antenna elements $1308_{1-4}$. Controlling the phase shifters of the individual antenna elements allows the generation of a directional beam $1310_{1,2}$ that has a direction which can be controlled using the phase controller. Hence, in this embodiment, the main direction of the directional field may depend on the way the phase shifters are configured. Such linear (1D) phased array's are described in the article by Bakhar et al. "*Microstrip linear phased array for smart antenna applications*", in International Journal of Electronics Engineering, 4(1), 2012, p. 39-42. FIG. 13B depicts an example of such phased array, including (in this example four) thin-film metal patch antenna elements $1324_{1-4}$ on a planar substrate 1322, e.g. a PCB, connected via micro strips 1323 to a power feed line 1320. The linear array of antenna elements may form a phased array antenna, wherein the directionality of the radiation beam may be controlled by changing position of the power feed line 1300 (e.g. moving it from the left to the right as depicted by the arrow in the figure).

Figure 14:
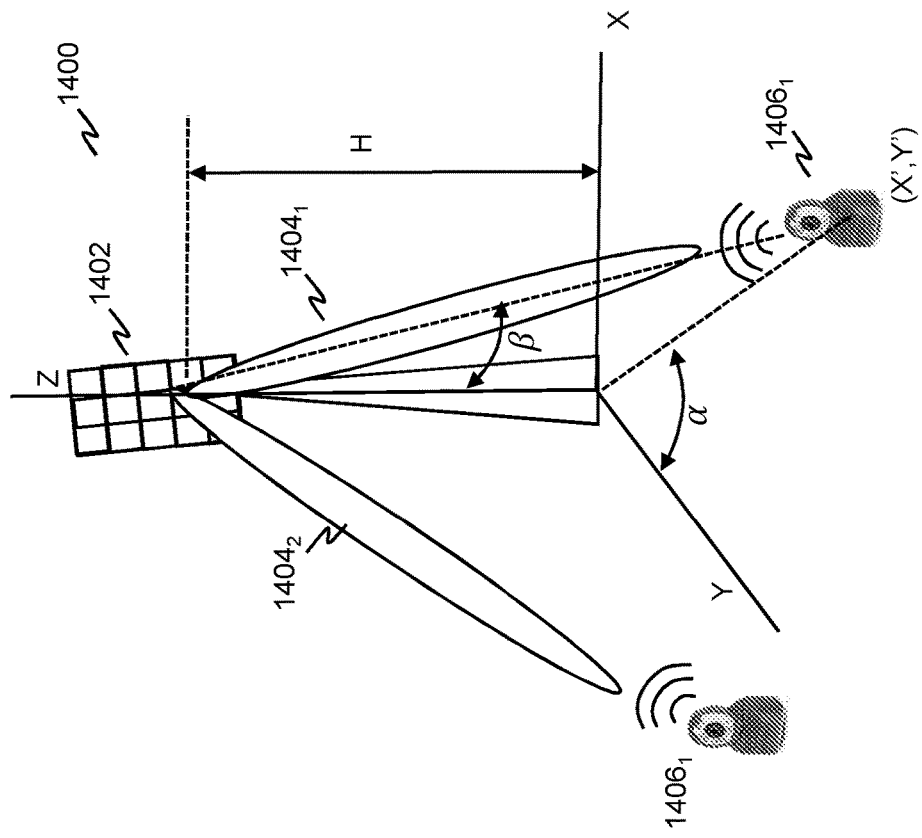
FIG. 14 depicts a base station according to an embodiment of the invention.

FIG. 14 depicts a base station according to an embodiment of the invention. As shown in this figure, a base station 1400 may include antenna structure mounted at a certain height H outdoors or in a stable. Such base station may be used in a livestock monitoring system as described with reference to FIG. 2. The antenna structure may be configured as a 2D phased array antenna 1402, which is a logical 2D extension of a 1D phased array antenna described with reference to FIG. 10A. The antenna may be installed at a predetermined height H above the ground and at a predetermined (absolute) geo-position X,Y (based e.g. on measured GPS coordinates). An antenna controller (not shown) may control the 2D phased array antenna 1402 in order to generate a directional radiation beam $1404_{1,2}$ that points to a certain direction defined by spherical coordinate angles α, β. Hence, the controller may scan a certain area by controlling the directional radiation beam of the 2D phased array antenna. If a mobile sensor device $1406_{1,2}$ connects to the antenna, the antenna may estimate the distance between the antenna and the sensor device using well known techniques such as a time of flight (TOF) technique and/or signal strength (e.g. RSSI). On the basis of the distance D between the sensor device and the antenna, the height H of the antenna, the angles α, β and the position X,Y of the antenna, position X',Y' of the sensor device may be determined. This way, an accurate estimate of the position of a sensor device may be determined. This position estimate may be used by the livestock monitoring system in order to provide a user of a mobile location device information about the (last) position of a certain animal.

Figure 15:
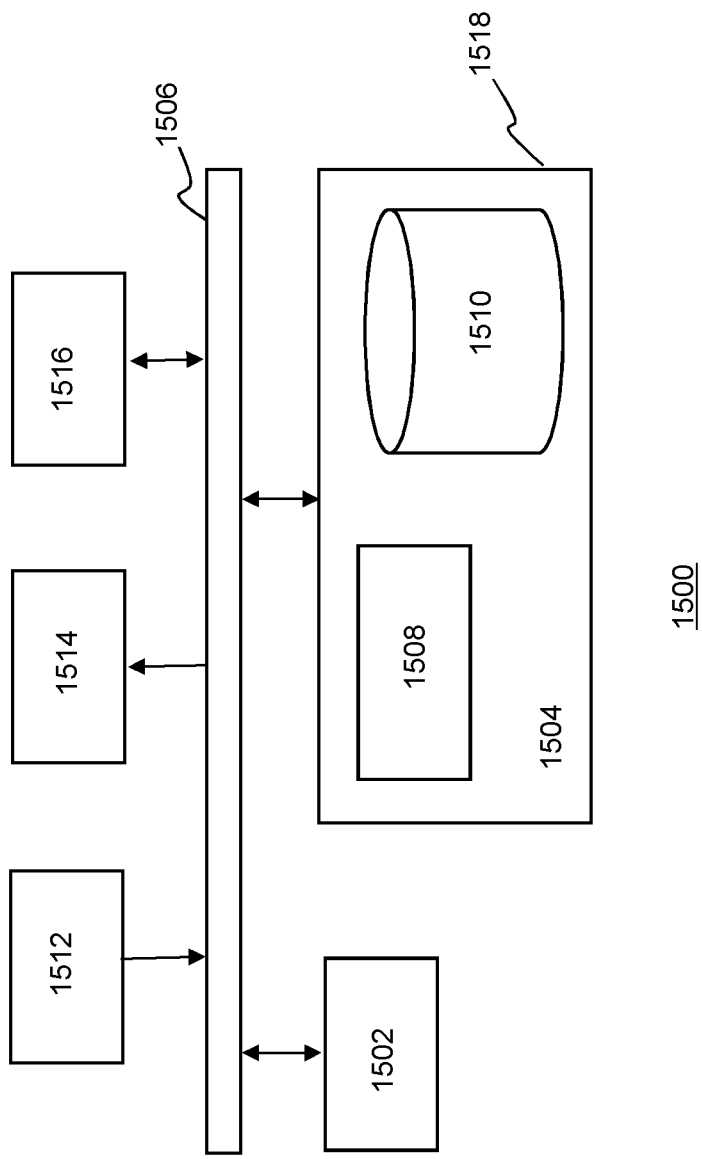
FIG. 15 is a block diagram illustrating an exemplary data processing system that may be used in systems and devices as described in this disclosure.

FIG. 15 is a block diagram illustrating an exemplary data processing system that may be used in embodiments described in this disclosure. Data processing system 1500 may include at least one processor 1502 coupled to memory elements 1504 through a system bus 1506. As such, the data processing system may store program code within memory elements 1504. Further, processor 1502 may execute the program code accessed from memory elements 1504 via system bus 1506. In one aspect, data processing system may be implemented as a computer that is suitable for storing and/or executing program code. It should be appreciated, however, that data processing system 1500 may be implemented in the form of any system including a processor and memory that is capable of performing the functions described within this specification.

Memory elements 1504 may include one or more physical memory devices such as, for example, local memory 1508 and one or more bulk storage devices 1510. Local memory may refer to random access memory or other non-persistent memory device(s) generally used during actual execution of the program code. A bulk storage device may be implemented as a hard drive or other persistent data storage device. The processing system 1500 may also include one or more cache memories (not shown) that provide temporary storage of at least some program code in order to reduce the number of times program code must be retrieved from bulk storage device 1510 during execution.

Input/output (I/O) devices depicted as input device 1512 and output device 1514 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1516 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1550.

As pictured in FIG. 15, memory elements 1504 may store an application 1518. It should be appreciated that data processing system 1500 may further execute an operating system (not shown) that can facilitate execution of the application. Application, being implemented in the form of executable program code, can be executed by data processing system 1100, e.g., by processor 1502. Responsive to executing application, data processing system may be configured to perform one or more operations to be described herein in further detail.

In one aspect, for example, data processing system 1500 may represent a client data processing system. In that case, application 1518 may represent a client application that, when executed, configures data processing system 1500 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1518, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Antenna module for configuring a mobile phone as a location device for locating one or more radiofrequency (RF) transmitters, respectively worn by one or more animals, the antenna module comprising:
    a planar support member for supporting a planar directional antenna structure including a plurality of planar antenna elements, wherein the antenna structure is configured to produce a directional receive pattern, the antenna elements including a transmitter electrode, a reflector electrode and a plurality of director electrodes configured to produce the directional receive pattern;
    a radio frequency (RF) receiver connected to the directional antenna structure;
    a mobile phone interface adapted to communicate with the mobile phone; a processor configured to control the RF receiver and the mobile phone interface;
    a housing connected to the planar support member for housing the RF receiver, the processor, and the mobile phone interface; and
    one or more connectors for removably fixating the mobile phone to the planar support member, wherein the processor is configured to execute the steps of:
        receiving one or more time series of beacon signals broadcast by one or more RF transmitters that are within the receiving pattern of the directional antenna structure, each beacon signal including at least a device identifier for identifying an RF transmitter that broadcasted the beacon signal;
        determining distance estimates for beacon signals in the one or more time series associated with at least one device identifier, a distance estimate being determined based on a signal strength or a signal quality of a detected beacon signal.

2. Antenna module according to claim 1 wherein the signal quality of a received beacon signal is based on the Link Quality Indicator as defined by the 802.15.4 Zigbee standard.

3. Antenna module according to claim 1 wherein the plurality of antenna elements defines a yagi-type, a patch-type, or a stripline-type antenna structure.

4. Antenna module according to claim 1 wherein the RF receiver is configured to detect beacon signals that have a transmission level range selected between −20 dBm and 10 dBm.

5. Antenna module according to claim 1 wherein the antenna structure comprises a first directional antenna and a second directional antenna connected to a microstrip coupling structure.

6. Antenna module according to claim 1 further comprising an antenna extender for extending the directionality and the sensitivity of the antenna.

7. Antenna module according to claim 1 wherein the mobile phone interface for establishing communication between the RF receiver and the mobile phone, comprises a hardwired interface, the hardwired interface including an electrical connecter, preferably an USB and Firewire connector.

8. Antenna module according to claim 1 wherein each of the one or more RF transmitters is configured to operate between 1 GHz and 10 GHz.

9. Antenna module according to claim 2 wherein the Link Quality Indicator is calculated on the basis of:

$$d = 2^{\frac{LQI-3(tx+A)-LQI\_1m}{LQI\_2x}}$$

wherein the parameter A represents a sensitivity of the directional antenna structure in dB, the parameter LQI_1m represents a link quality for the RF transmitter broadcasting at a distance of 1 meter at a transmission level of 0 dB (in the strongest direction) and wherein LQI_2x is the change in LQI units when doubling the distance.

10. Antenna module according to claim 1 wherein the signal quality of a received beacon signal is based on a received signal strength indication (RSSI) of a beacon signal, wherein the distance estimate d is calculated on the basis of:

$$d = 2^{\frac{RSSI-tx-RSSI\_1m}{6}}$$

wherein the parameter RSSI is the received signal strength indication (in units of dB), tx the transmission level in dB and RSSI_1m the signal strength at 1 m when broadcasting at a transmission level of 0 dB (in the strongest direction).

11. Antenna module according to claim 1 wherein the plurality of antenna elements forms a linear phased array antenna structure including a plurality of antenna elements and a plurality of phase shifters configured to control the phase of a signal transmitted by each of the antenna elements.

12. Antenna module according to claim 1 wherein the broadcast interval of the beacon signals is selected between 1 Hz and 10 Hz.

13. Antenna module according to claim 1 wherein the beacon signals further includes at least one of: a sequence number, a time stamp, state information of an animal or object associated with the RF transmitter.

14. Antenna module according to claim 5 wherein the microstrip coupling structure is a rat-race coupler or a hybrid ring coupler.

15. Antenna module according to claim 5 wherein the microstrip coupling structure includes (i) a circular microstrip and (ii) a first input microstrip, a second input microstrip, a first output microstrip, and a second output microstrip connected to the circular microstrip, such that, when the first directional antenna and the second directional antenna respectively receive a first signal and a second signal, the output signal at the first output of the microstrip coupling structure represents a sum signal of the first and second received signal and the output signal at the second output of the microstrip coupling structure represents a difference signal between the first received signal and the second received signal.

16. Antenna module according to claim 6 wherein the antenna extender is connected to the (back of the) planar support member of the directional antenna.

17. Antenna module according to claim 1 wherein the mobile phone interface comprises a wireless interface.

18. Antenna module according to claim 1 wherein the antenna module and the RF transmitter are configured to communicate on the basis of a wireless communication standard.

19. Antenna module according to claim 18 wherein the wireless communication standard is selected from one of: Zigbee (IEEE 802.15.4), Z-Wave, WiFi (IEEE 802.11), Sigfox, Neul, LoRaWan.

20. Antenna module according to claim 15 wherein the circular microstrip includes a top half part and a bottom half part, the top half part and the bottom half part each having a length of three quarter wavelength, the first input, the first output, the second input and the second output being located along the top part of the circular microstructure, the distance between the input/output or output/input being a quarter wavelength, the wavelength being the wavelength at which the first and second directional antenna detect the beacon signals.

* * * * *